US010279483B2

(12) United States Patent
Gosselin et al.

(10) Patent No.: US 10,279,483 B2
(45) Date of Patent: May 7, 2019

(54) CO-HANDLING ROBOT COMPRISING ROBOT CONTROL MEANS

(71) Applicant: COMMISSARIAT A L'ENERGIE ATOMIQUE ET AUX ENERGIES ALTERNATIVES, Paris (FR)

(72) Inventors: Florian Gosselin, Vanves (FR); Xavier Lamy, Issy-les-Moulineaux (FR); Dominique Ponsort, Bievres (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 194 days.

(21) Appl. No.: 15/321,264

(22) PCT Filed: Jun. 3, 2015

(86) PCT No.: PCT/EP2015/062407
§ 371 (c)(1),
(2) Date: Dec. 22, 2016

(87) PCT Pub. No.: WO2015/197333
PCT Pub. Date: Dec. 30, 2015

(65) Prior Publication Data
US 2017/0157776 A1     Jun. 8, 2017

(30) Foreign Application Priority Data
Jun. 23, 2014    (FR) ...................................... 14 55811

(51) Int. Cl.
*B25J 13/02*    (2006.01)
*B25J 9/16*     (2006.01)
(Continued)

(52) U.S. Cl.
CPC ................. *B25J 13/02* (2013.01); *B25J 1/00* (2013.01); *B25J 3/04* (2013.01); *B25J 9/16* (2013.01);
(Continued)

(58) Field of Classification Search
CPC ... B25J 13/02; B25J 13/025; B25J 1/00–1/12; B25J 3/00–3/04; G05B 2219/36429
See application file for complete search history.

(56) References Cited

U.S. PATENT DOCUMENTS

2012/0237319 A1* 9/2012 Jacobsen ................... B25J 3/04
                                                    414/1

FOREIGN PATENT DOCUMENTS

| JP | 04-002478 A | 1/1992 |
| JP | 2005-334999 A | 12/2005 |
| WO | 2012/149402 A2 | 11/2012 |

OTHER PUBLICATIONS

International Search Report of PCT/EP2015/062407 dated Aug. 28, 2015 [PCT/ISA/210].

* cited by examiner

*Primary Examiner* — Spencer D Patton
(74) *Attorney, Agent, or Firm* — Sughrue Mion, PLLC

(57) ABSTRACT

The invention relates to a robot comprising a tool (8), a first chain of elements having a proximal end element (6) and a distal end element (7) to which the tool is connected, at least one control member (9) of the robot connected to one of the elements of the first chain of elements other than the distal end element, control means (13, 14, 15) for at least one part of the first element chain and the control member in order to associate, with a movement of the control member relative to the proximal end element along at least one degree of freedom of the control member, a more complex movement
(Continued)

of the distal end element relative to the proximal end element along at least one of the degrees of freedom of the distal end element.

22 Claims, 14 Drawing Sheets

(51) Int. Cl.
*B25J 1/00* (2006.01)
*B25J 3/04* (2006.01)
(52) U.S. Cl.
CPC .............. *G05B 2219/36429* (2013.01); *G05B 2219/39004* (2013.01)

Zoom A

CO-HANDLING ROBOT COMPRISING ROBOT CONTROL MEANS

CROSS REFERENCE TO RELATED APPLICATIONS

This application is a National Stage of International Application No. PCT/EP2015/062407, filed Jun. 3, 2015, claiming priority based on French Patent Application No. 14 55811, filed Jun. 23, 2014, the contents of all of which are incorporated herein by reference in their entirety.

The invention relates to a co-manipulation robot comprising means for controlling the robot.

BACKGROUND OF THE INVENTION

In the field of robotics, there are various systems that provide operators with assistance in their tasks.

In order to manipulate objects remotely and carry out difficult tasks, there are first of all systems referred to as remote-operation or teleoperation systems. These systems are generally made up of a master arm and of a slave arm which are coupled together.

However, these are systems that are complex, both in their design and in their use. They therefore prove to be expensive and difficult to master. In general, the productivity obtained with these systems is inferior to that obtained by working directly on a component, with bare hands or using tools, in order to perform the task.

To assist the operator in carrying out a complex and/or difficult task while at the same time maintaining a system that is simpler than the remote-operation systems, systems referred to as co-manipulation systems have been developed. These systems are generally made up of a co-manipulation robot which performs the task that is to be accomplished via a tool and which comprises an operating member that allows the operator to control the movements of said co-manipulation robot via said operating member. Such a co-manipulation robot thus allows the tool to be manipulated jointly with the operator and therefore assists the operator in performing the task that is to be accomplished.

However, the movements performed by the operator are then generally reproduced exactly by the tool. Thus, this type of robot proves to be capable of efficiently assisting the operator only in executing tasks that are simple.

OBJECT OF THE INVENTION

One object of the invention is to propose a co-manipulation robot that makes it possible to overcome, at least in part, the aforementioned disadvantages.

BRIEF DESCRIPTION OF THE INVENTION

In order to achieve this objective, there is proposed a co-manipulation robot comprising:
a first chain of elements which comprises a proximal end element forming a base of the robot and a distal end element, the various elements being mounted with the ability to move relative to one another so that the distal end element can be moved relative to the proximal end element,
at least one robot operating member, said member being connected to one of the elements of the first chain of elements, other than the distal end element, and being designed to be able to be moved directly by an operator relative to the proximal end element,
control means for controlling at least part of the first chain of elements and the operating member,
the first chain of elements, the operating member and the control means being configured so that at least one movement of the operating member relative to the proximal end element according to at least one degree of freedom of the operating member has, associated with it, a more complex movement of the distal end element relative to the proximal end element according to at least one of the degrees of freedom of the distal end element.

Thus, the control means allow at least some of the degrees of freedom of the operating member to be coupled with at least some of the degrees of freedom of the distal end element, thus allowing them to force the distal end element to perform a movement that is more complex than the movement imposed by the operator on the operating member. It is nevertheless still the operator who controls the movements of the first chain of elements and therefore of the distal end element by interacting physically with the operating member connected to said first chain of elements. Thanks to the coupling between the distal end element and the operating member, the operator can physically feel the interactions between the robot and its environment. Furthermore, his action may possibly be assisted or guided by the robot, making it easier to perform the task that is to be performed. In particular, the fact that certain movements of the distal end are coupled to a movement of the operating member makes the robot intuitive for the operator to use.

The invention therefore proves to be particularly useful for carrying out tasks that require complex movements of the distal end element relative to an object or relative to the environment of the robot, these tasks being controlled by simple movements of the operating member. It allows better co-manipulation ergonomics and can be used to perform complex tasks more quickly and more efficiently than co-manipulation robots of the prior art.

The invention also proves to be particularly useful for carrying out a task that is difficult or dangerous at the level of the distal end element. Specifically, the fact that the operating member is not connected to the distal end element means that the operator can be distanced from the distal end element and therefore from the dangerous working zone.

The essential features of the invention are therefore:
the presence of two ports of interaction on the co-manipulation robot, one of these interactions being with the operator via the operating member and the other with the environment via the distal end element;
the fact that the operating member is not incorporated into the distal end element, thereby allowing the operator to be distanced from the work zone and allowing him to be made to perform different and smaller-amplitude movements than those of the distal end element;
the presence of the control means which allows the incorporation of couplings between the operating member and the distal end element;
the fact that at least one of the movements of the operating member is associated with a more complex movement of the distal end element.

According to one particular embodiment, the first chain of elements, the operating member and the control means are configured to impose at least one movement of the operating member relative to the proximal end element and/or to impose forces applied to the operating member.

In that way, it is possible to bring about a movement of the operating member and/or to apply a force to said operating member to oppose the movements imposed on the operating member by the operator, so as to guide the movements imposed by the operator on the operating member or to assist the movements imposed by the operator on the operating member or to provide the operator with force feedback. The actions are thus assisted or guided by the robot, making the task that is to be carried out easier to perform.

According to one particular embodiment, the first chain of elements, the operating member and the control means are configured so that forces applied to the distal end element are coupled to a movement of the operating member relative to the proximal end element and/or to forces applied to the operating member by the operator.

Thus, the operator may control the forces applied to the distal end element and thus the forces applied by the robot to its environment. The operator can therefore gain a better physical feel for the interactions between the robot and its environment. The robot is particularly intuitive for the operator to use.

In particular, the first chain of elements, the operating member and the control means are configured so that each movement of the distal end element relative to the proximal end element is coupled to a movement of the operating member relative to the proximal end element and/or to forces applied to the operating member by the operator, at least one of the movements of the distal end element relative to the proximal end element being coupled to a movement of the operating member relative to the proximal end element.

The fact that all the movements of the distal end are coupled to a movement of the operating member or to forces applied to the operating member makes the robot particularly intuitive for the operator to use.

Throughout the present application, what is meant by "coupling" is a mathematical function that links the movements of the distal end element and/or the forces applied to said element with the movements of the operating member and/or the forces applied to the operating member.

Throughout the present application, what is meant by "more complex movement" of the distal end element is that for a given movement of the operating member relative to the base, the corresponding movement of the distal end element relative to the base comprises a greater number of degrees of freedom. The more complex movement is thus correlated with the associated movement of the operating member while at the same time being able to conform to one or more additional constraints. For example, the distal end follows a movement imposed by the operating member while at the same time conforming to the constraint of "remaining perpendicular to the object on which the robot is interacting".

Thus, a more ample movement of the distal end element relative to the base does not correspond to the definition of a "more complex movement" of the invention (even though in the invention, for a given movement of the operating member relative to the base, the corresponding movement of the distal end element relative to the base may be both more complex and more ample).

BRIEF DESCRIPTION OF THE DRAWINGS

The invention will be better understood in the light of the description which follows of some nonlimiting particular embodiments of the invention.

Reference will be made to the attached figures, among which.

DETAILED DESCRIPTION OF THE INVENTION

Figure 1:
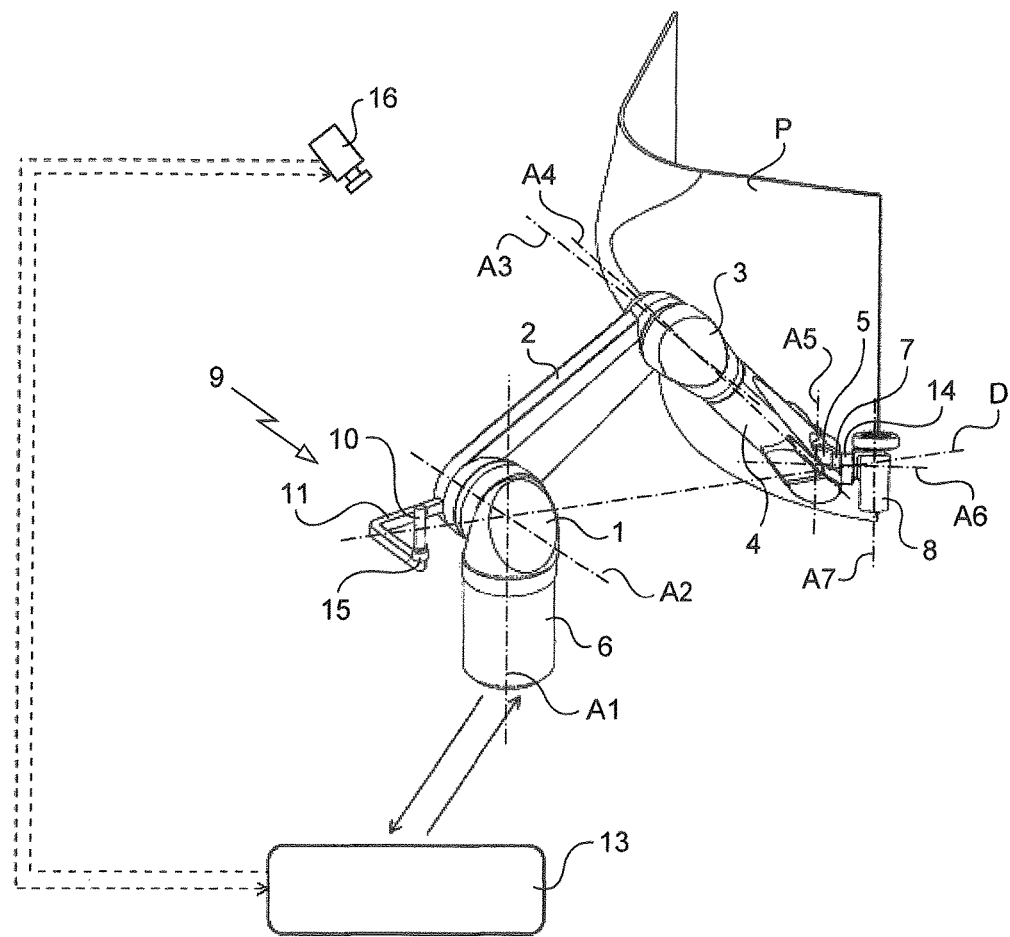
FIG. 1 is a three-dimensional schematic view of a co-manipulation robot according to a first embodiment of the invention.
Figure 2:
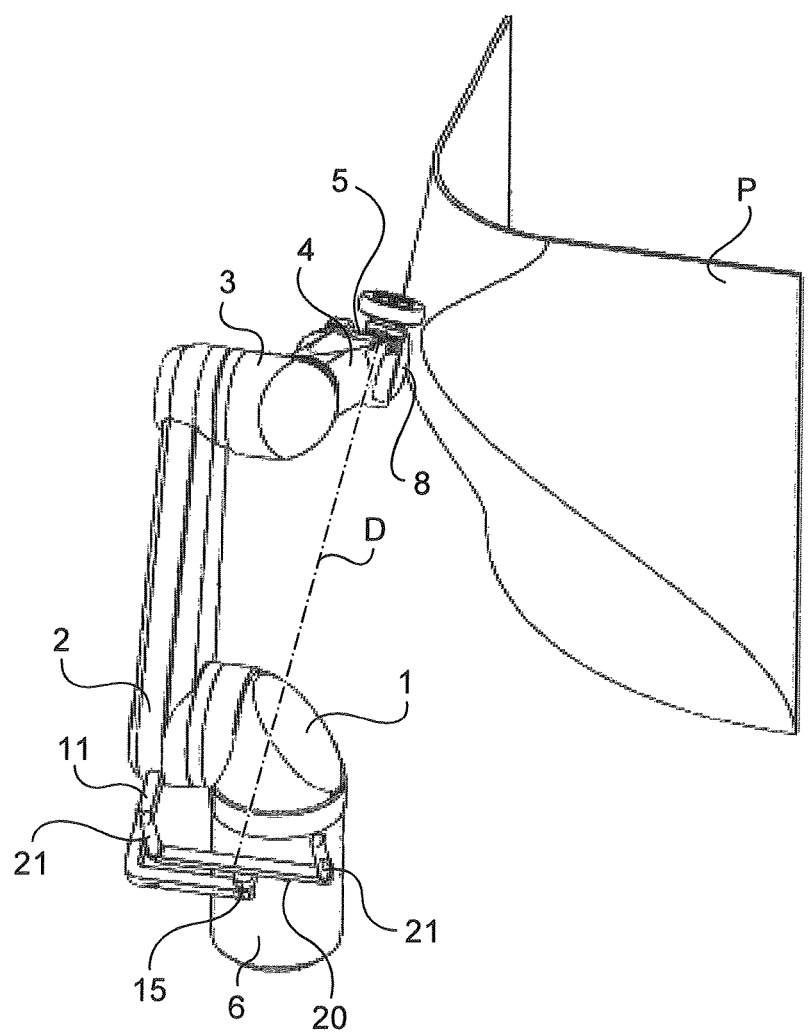
FIG. 2 illustrates a first alternative form of the co-manipulation robot illustrated in FIG. 1.
Figure 3:
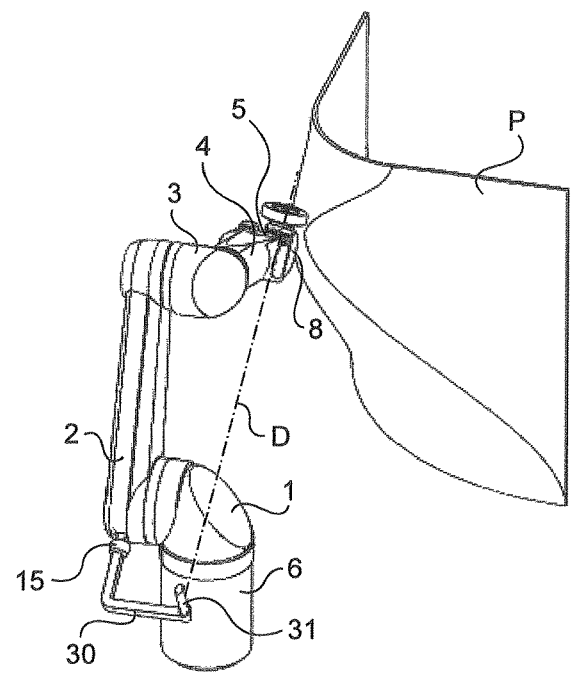
FIG. 3 illustrates a second alternative form of the co-manipulation robot illustrated in FIG. 1.
Figure 4:
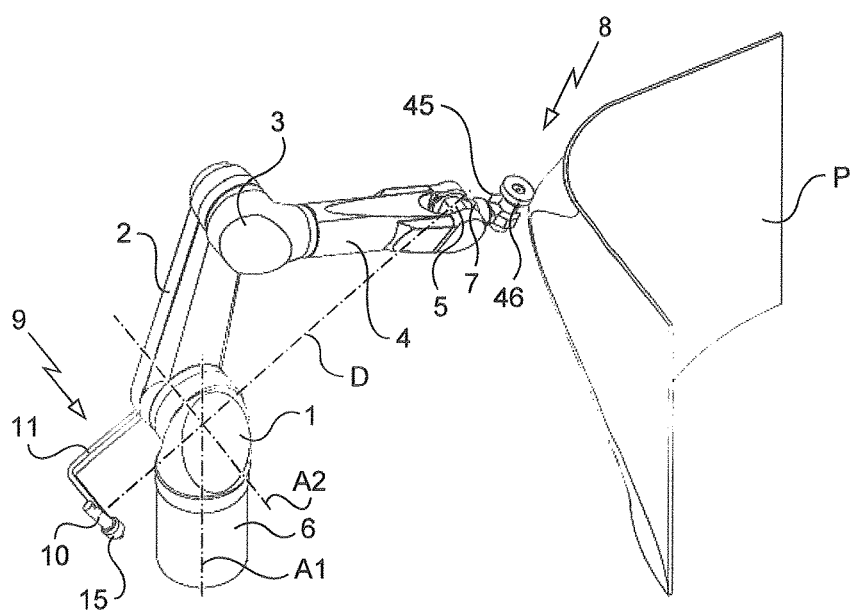
FIG. 4 illustrates a third alternative form of the co-manipulation robot illustrated in FIG. 1.

FIG. 1 illustrates a co-manipulation robot according to a first embodiment of the invention.

The co-manipulation robot comprises a main chain of elements articulated to one another which comprises a proximal end element 6 forming a base of the robot and a distal end element 7. Said main chain of elements here is a chain having six degrees of freedom and made up of:
  the base 6,
  a first element 1 pivot mounted on the base 6 about a first axis A1,
  a second element 2 pivot mounted on the first element 1 about a second axis A2,
  a third element 3 pivot mounted on the second element 2 about a third axis A3,
  a fourth element 4 pivot mounted on the third element 3 about a fourth axis A4,
  a fifth element 5 pivot mounted on the fourth element 4 about a fifth axis A5, and
  the distal end element 7 pivot mounted on the fifth element 5 about a sixth axis A6.

The chain of elements here is advantageously configured so that:
  the first axis A1 and the second axis A2 are concurrent and perpendicular, the third axis A3 and the fourth axis A4 are concurrent and perpendicular, the fourth axis A4 and the fifth axis A5 are concurrent and perpendicular, and the fifth axis A5 and the sixth axis A6 are concurrent and perpendicular.

In particular, the robot comprises a tool 8. The tool 8 here is a motorized sander consisting of a body and of a rotary brush having as axis of rotation a seventh axis A7. The tool is thus intended to sand an object P such as, for example, the stem of a boat. The tool 8 is connected to the distal end element 7 in such a way as to have, like said distal end element 7, six degrees of freedom relative to the base 6 (degrees of freedom identical to those of the distal end element 7). The tool 8 may thus be moved in all directions in space translationally and rotationally relative to the base 6. The axis A7 of the tool 8 may in particular be kept parallel to the plane tangential to the surface of the object P at the point of contact between the rotary brush and said object P.

The robot furthermore comprises an operating member which here comprises a handgrip 9. The handgrip 9 comprises, for example, a grasping zone configured as a rod 10 and control buttons arranged on said rod (these have not been depicted and will be described later on).

The handgrip 9 needs to have a sufficient number of degrees of freedom for the operator to be able to perform the sanding task, namely, as minimum, to move the tool 8 over the entire surface of the object P if the sanding force is regulated automatically or to move the tool 8 over the entire surface of the object P and to regulate the sanding force if this force is managed by the operator. The movement of the tool 8 over the surface of the object P is a two-dimensional surface movement. The handgrip 9 needs therefore to have at least two degrees of freedom.

In particular, the handgrip 9 is connected to a projecting part 11 of the second element 2. Because the second element 2 here has two degrees of freedom, the handgrip 9 also here has two degrees of freedom identical to those of the second element 2. This arrangement is particularly advantageous because it allows the handgrip 9 to be moved in two degrees of freedom without a secondary chain of elements being needed for linking the handgrip 9 to the main chain of elements.

Furthermore, the second element 2 here has a "turret" type movement and the projecting part 11 is configured in such a way that the handgrip 9 is distant from the first axis A1 and from the second axis A2 so that the second element 2 can easily be moved about said first axis A1 and said second axis A2 by moving the handgrip 9. Thus, the handgrip 9 has small-amplitude movements which are also highly ergonomic. By moving the handgrip 9 in its two degrees of freedom, an operator can "target" a precise point on the surface of the object P.

The robot furthermore comprises means for controlling the robot and, in particular, for controlling the handgrip 9 and the main chain of elements, and therefore the tool 8 which is connected to the distal end element 7.

The control means here comprise a controller 13 which executes control programs that control the main chain of elements of the robot to ensure coupling between the handgrip 9 and the tool 8. More specifically, the controller 13 here is configured to manage the coupling of the movements of the handgrip 9 and of the tool 8 and of the forces exerted on the handgrip 9 by an operator and of the forces exerted by the object P on the tool 8.

The control means also comprise drive members which allow these couplings to be implemented, each drive member here being arranged at one of the articulations of the main chain of elements so as to be able to cause one of the elements to move relative to the other element of the articulation concerned or so as to apply a force between these elements. The controller 13 controls the various drive members so as to be able to move the tool 8 and the handgrip 9 in a coordinated fashion relative to the base 6.

The control means here also comprise load measurement means which for example comprise a first multiaxis load cell 14 which is arranged between the distal end element 7 and the tool 8 so as to be able to generate, for the attention of the controller 13, signals indicative of the forces applied by the object P to the tool 8. The tool 8 is thus connected to the distal end element 7 via said multiaxis load cell 14. The load measuring means here furthermore comprise a second multiaxis load cell 15 which is arranged between the second element 2 and the handgrip 9 so as to be able to generate, for the attention of the controller 13, signals indicative of the forces applied to the handgrip 9 by the operator. The handgrip 9 is thus connected to the projecting part 11 of the second element 2 via said multiaxis load cell 15.

The load cells may comprise strain gages.

The control means additionally comprise displacement measurement means which here comprise a plurality of position sensors, each sensor being arranged at one of the articulations of the main chain of elements so as to be able to generate, for the attention of the controller 13, signals indicative of the relative position of the two elements that make up the articulation concerned. The position sensors may comprise angular encoders.

The position sensors and the multiaxis load cells thus allow the controller 13 at any moment to measure the movements of the tool 8 and of the handgrip 9 with respect to the base 6 and at any moment the forces applied to the handgrip 9 and to the tool 8.

In particular, the robot here comprises cowlings which are able to hide the various drive members and position sensors (which are therefore not visible in FIG. 1).

From the signals received by the position sensors and the multiaxis load cells, the controller 13 controls the various drive members so as to couple the movements and/or the forces of the handgrip 9 to those of the tool 8.

The controller 13 is, for example, here configured so that, on the basis of the signals generated by the position sensors, the controller 13 controls the various drive members so that any movement of the handgrip 9 about the first axis A1 and about the second axis A2 is used to move the tool 8 over the surface of the object P that is to be sanded at the location targeted by a straight line D connecting the center of the handgrip 9 to the point of concurrence of the first axis A1 and of the second axis A2, such that this straight line always passes substantially close to the center of the tool 8 whatever the positions of the robot and of its main chain of elements. It may be noted that the distance from said straight line D to the center of the tool 8 may vary according to the configuration of the robot and may even be zero for certain robot configurations. Because the second element 2 and the third element 3 advantageously have dimensions greater than those of the projecting part 11, the tool 8 is further away from the point at which the first axis A1 and the second axis A2 meet than is the handgrip 9 and the movements of the tool 8 are amplified with respect to those of the handgrip 9.

The controller 13 is also configured so that on the basis of the signals generated by the position sensors, the controller 13 controls the various drive members in order to keep the seventh axis of rotation A7 parallel to the plane tangential to the surface of the object P at the point of contact of the rotary brush with said surface of the object P, this being whatever the movements of the handgrip 9 about the first axis A1 and about the second axis A2.

Furthermore, the controller 13 is configured here in such a way that, on the basis of the signals generated by the two multiaxis load cells, the controller 13 controls the various drive members in such a way that the sanding force, namely the force exerted by the tool 8 on the object P, is regulated according to the forces exerted on the handgrip 9 by the operator. The force exerted on the object P by the tool 8 perpendicular to the surface of the object P is, for example, amplified relative to the force exerted by the operator on the handgrip 9 along the straight line D.

It may be noted that the sanding force could also be regulated automatically on the basis only of the signals generated by the multiaxis load cell 14, without it being operated directly by the operator, without departing from the scope of the invention.

The controller 13 thus allows a coupling of the handgrip 9 to the tool 8 in order for a simple turret-like movement of the handgrip 9 with two degrees of freedom to have associated with it a more complex movement of the tool 8 with six degrees of freedom. Thus, although the operator is performing a simple and ergonomic action with two degrees of freedom and of small amplitude at the handgrip 9, the controller 13 allows the tool 8 to perform a more complex movement, with six degrees of freedom and greater amplitude, needed for performing the task.

For preference, the controller 13 may furthermore also control the various drive members so as to cause a movement of the handgrip 9 relative to the base 6 and/or so as to apply a force to said handgrip 9 to oppose the movements imposed on the handgrip 9 by the operator, to guide the movements imposed on the handgrip 9 by the operator or to assist the movements imposed on the handgrip 9 by the operator. The controller 13 thus also allows the operator to be provided with force feedback or assisted or guided in his actions.

In particular, the control means comprise an external measurement system 16 which comprises for example a viewing device comprising a camera, said external measurement system 16 being associated with the controller 13. Thus, the controller 13 may use the signals coming from the external measurement system 16 to supplement or as a substitute for the signals from the various position sensors in order to determine the position of the tool 8 and of the handgrip 9 relative to the base 6 and/or the position of the tool 8 with respect to the object P in order to control the various drive members accordingly. The controller 13 may also use the signals coming from the external measurement system 16 to determine the degree of progress being made with the sanding task and control the various drive members accordingly.

The main features of this first embodiment are therefore:
the presence of two interaction ports installed directly on the robot, one for interaction with the operator via the handgrip 9 and the other for interaction with the external environment of the robot via the tool 8;
the fact that the handgrip 9 is secured to an element of the main chain of elements other than the distal end element 7, which allows it to be distanced from the tool 8 and made to perform movements that are different and of smaller amplitude than those of the tool 8 and of the distal end element 7 to which the tool 8 is connected;
the presence of a controller 13 allowing coupling between the movements of the handgrip 9 and those of the tool 8;
the fact that the various axes of rotation of the robot are motorized, which allows the operator to be assisted with force and also provided with force feedback at the handgrip 9;
the fact that the robot incorporates means for measuring the forces applied by the operator to the handgrip 9 and the forces exerted by the object P on the tool 8.

The co-manipulation robot of the first embodiment according to the invention allows the operator to be assisted in his sanding task.

As has already been indicated, such sanding needs to be performed using a rotary brush that needs to be positioned at each point on the surface of the object P. With a cylindrical rotary brush like the one illustrated here with reference to FIGS. 1 to 5, the axis of rotation of said brush also needs to be kept parallel to the plane locally tangential to this surface at the point of contact of the rotary brush with said surface of the object P. Finally, the force applied by the rotary brush to the object P needs to be controlled. All this ensures good quality sanding.

Traditionally, this task was performed by the operator unaided. The operator had thus to perform large amplitude actions in order to sand the entire surface of the object P, and this was tiring. He also had to make large movements of his wrist in order to keep the rotary brush tangential to the surface of the object P, and this was somewhat unergonomical in certain situations where the wrist was very highly flexed. Finally, he had to apply significant force both for holding the tool 8 and for sanding the object P, and this was, once again, tiring.

The co-manipulation robot according to the first embodiment makes it possible to make the sanding task easier for the operator who nevertheless retains sole control of the tool 8, the tool 8 not being moved unless the operator is moving the handgrip 9. The movements of the handgrip 9 are advantageously simpler and smaller in amplitude from those of the tool 8 while at the same time allowing control over the essential degrees of freedom of the task, namely the movement of the tool 8 over the entire surface of the object P if the sanding force is regulated automatically or the movement of the tool 8 over the entire surface of the object P and the regulation of the sanding force, if this force is managed by the operator.

Of course the first embodiment described is nonlimiting and variations can be made thereto without departing from the scope of the invention as defined by the claims.

In particular, it would be possible to use any other main chain of elements suited to the task that is to be performed. It will thus be possible to use any other kinematics than those illustrated, for example a co-manipulation robot of the SCARA, DELTA type, a redundant robot or a parallel robot.

The handgrip 9 may adopt any form suited to being grasped and handled ergonomically by the operator. For example, in a first alternative form of the first embodiment illustrated in FIG. 2, the handgrip 9 comprises two grasping zones rather than a single one as described previously, so that the handgrip 9 can be handled with two hands. The handgrip 9 thus comprises a body 20 equipped with two grasping zones each configured as a handle 21, each handle 21 being intended to be grasped in one hand. The robot could then comprise only the second multiaxis load cell 15 arranged between the body 20 of the handgrip 9 and the projecting part 11 of the second element 2, as illustrated, or could comprise two multiaxis load cells arranged respectively between each handle 21 and the body 20 of the handgrip. In a second alternative form of the first embodiment, illustrated in FIG. 3, the handgrip 9 itself comprises a projecting part 30 which is connected at one of its ends to the second element 2 (which no longer has any projecting part itself) and which at its other end bears a grasping zone configured as a rod 31. The projecting part 30 of the handgrip 9 allows the rod 31 to be distanced from the first axis A1 and from the second axis A2. The second multiaxis load cell 15 is then arranged between the second element 2 and the projecting part 30 of the handgrip 9.

Depending on the task that is to be accomplished, it is also possible to have a tool 8 different from the one described.

The tool 8 may thus comprise a gripper such as, for example, a motorized two-jaw clamp which may act directly or indirectly on the environment. In a third alternative form of the first embodiment, illustrated in FIG. 4, the tool 8 comprises a motorized two-jaw clamp 45 and a motorized sander 46 which is held by said clamp 45. Being clamped in the jaws of the clamp 45, the motorized sander 46 is secured to said clamp 45 which is itself connected to the distal end element 7. In another alternative form, the motorized two-jaw clamp may hold a different instrument held by said clamp.

It may also be noted that it is possible in place of the two-jaw clamp to use a more complex gripper such as, for example, a dexterous gripper or a robotic hand. It will also be noted that for certain tasks it may be possible to act on the environment using a passive tool such as, for example, a non-rotary brush or a screwdriver. It may also be possible to act on the environment directly using the clamp or the robotic hand, which means to say that the clamp or the robotic hand will not be holding any sander or other instrument. Finally, in some cases it may be possible to act on the environment directly using the distal end element of the robot or using the multiaxis load cell 14, no tool, clamp or other gripper then being connected to the distal end element.

Ranges of movement may be inserted between the handgrip 9 and the second element 2 notably for the purposes of enriching the control that the operator has over the task that is to be performed. In a fourth alternative form of the first embodiment, illustrated in FIG. 5, the handgrip 9 is connected to the projecting part 11 of the second element 2 via a secondary chain of elements. Said secondary chain of elements here comprises an additional body 41 which is mounted on the second element 2 of the main chain of elements so as to be able to be moved translationally along an eighth axis A8 with respect to said second element 2, the handgrip 9 being connected to said additional body 41 via the second multiaxis load cell 15 so as to have the same degrees of freedom as said additional body 41. Thus, the handgrip 9 has three degrees of freedom while the distal end element 7, and therefore the tool 8, still have six. The robot therefore has a treelike structure, with a main kinematic chain between the base 6 and the distal end element 7 carrying the tool and a secondary kinematic chain between the base 6 and the additional body 41 carrying the handgrip 9. The additional mobility of the handgrip 9 along the eighth axis A8 can be used to implement more highly evolved couplings between the handgrip 9 and the tool 8. Thus, the controller 13 may be configured so that the movements of the handgrip 9 about the first axis A1 and about the second axis A2 are used to move the tool 8 over the surface that is to be sanded of the object P, while keeping the seventh axis A7 parallel to the plane tangential to the surface of the object P at the point of contact of the rotary brush with said object P, and so that the movements of the handgrip 9 along the eighth axis A8 are used to regulate the force with which the tool 8 is pressed against the object P, this force advantageously being amplified with respect to that applied by the operator to the handgrip 9.

The robot will advantageously be configured so that the eighth axis A8 is parallel to the straight line D and concurrent with the axis A2 so that the movement of the handgrip 9 along said eighth axis A8 is decoupled from the "turret" type movements about the first axis A1 and about the second axis A2.

In practice, in the robots illustrated in FIGS. 1 to 5, the movement amplification ratio between the movement of the handgrip 9 and that of the tool 8, 45, 46 is a direct function firstly of the dimensions of the projecting part 11 of the second element 2, of the body 41 and of the body 20, 30 of the handgrip 9 which define the distance between the handgrip 9 and the point of concurrence of the first axis A1 and of the second axis A2 and secondly of the dimensions of the second element 2, of the third element 3, of the fourth element 4, of the fifth element 5, of the distal end element 7, of the load cell 14, of the tool 8, 45, 46 and of the configuration of the elements 2 to 7 which define the distance between the tool 8 and the point of concurrence of the first axis A1 and of the second axis A2.

Figure 5:
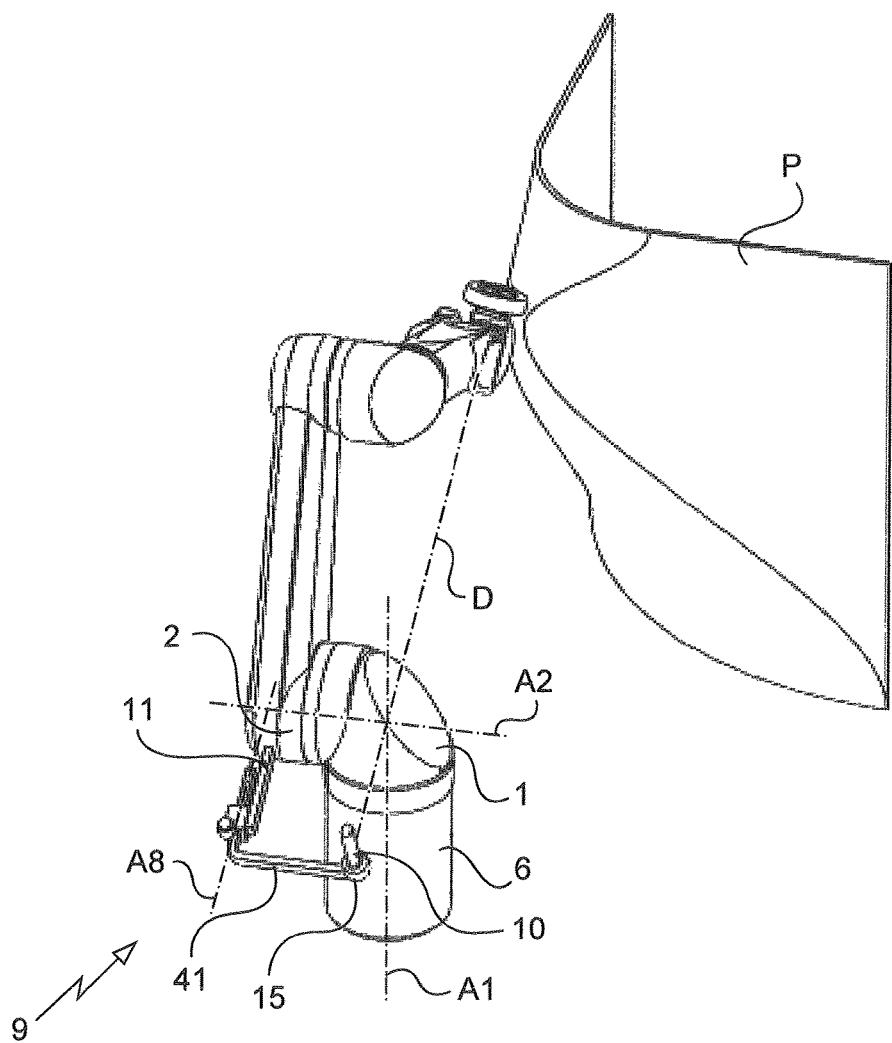
FIG. 5 illustrates a fourth alternative form of the co-manipulation robot illustrated in FIG. 1.

In the robot illustrated in FIG. 5, by changing the distance between the handgrip 9 and the first axis of rotation A1 and the second axis of rotation A2, it is possible to alter said amplification ratio. This modification may be made when setting up the robot. The connection between the additional body 41 and the second element 2 may thus be made via a simple passive guideway system, which means to say one that is not motorized, that allows the distance between the handgrip 9, the second axis A2 and the first axis A1 to be modified, the additional body 41 being fixed to the second element 2 for example using a screw before the robot enters service. This modification may also be performed continuously during the course of the sanding task if the translational movement of the additional body 41 relative to the second element 2 is motorized. In any case, this modification will be taken into consideration in the controller 13 for operating the robot correctly whatever the distance between the handgrip 9 and the first axis A1 and the second axis A2.

Of course, it will be possible to add other mobilities into the secondary chain of elements. The translational movement along the eighth axis A8 is provided only by way of example. Thus it might be possible to add, between the second element 2 and the handgrip 9, several translational movements or one or more rotational movements or even a combination of the two. It might also be possible to use, for the secondary chain of elements, a parallel or even treelike structure, so that the handgrip 9 could be manipulated with two hands by the same operator or by two separate operators.

It might be possible for example to place the projecting part 11 of the second element 2 in the continuation of said second element 2 so that said projecting part 11 extends on the opposite side to the third element 3, the handgrip 9 being connected to the projecting part 11 of the second element 2 via a secondary chain of elements. Said secondary chain of elements will advantageously comprise an additional body which will be pivot mounted on the projecting part 11 of the second element 2 of the chain of elements and which will be controlled by the controller 13 so as to form, with the projecting part 11 of the second element 2 on the one hand, and with the second element 2 and the main axis of extension of the third element 3 and of the fourth element 4 on the other hand, a pantograph structure that ensures that the ratio between the distance from the center of the handgrip 9 to the first point of concurrence of the first axis A1 and of the second axis A2 and between the distance from the first point of concurrence to the second point of concurrence of the fourth axis A4, of the fifth axis A5 and of the sixth axis A6 remains constant whatever the movements of the handgrip. In that case, the straight line D may always pass through the second point of concurrence of the fourth axis A4, of the fifth axis A5 and of the sixth axis A6, and through the center of the tool 8, if in order to create the movements about the fourth axis A4, about the fifth axis A5 and about the sixth axis A6, use is made of a centered handgrip and if the center of the tool 8 lies at the second point of concurrence.

It will even be possible to connect the handgrip 9 to any other element of the main chain of elements other than the distal end element 7, either directly or via a secondary chain of elements, and/or via force measurement means such as a multiaxis load cell, the only limitations being, on the one hand, that the handgrip 9 needs to have a sufficient number of degrees of freedom to be able to control the movements characteristic of the task that is to be performed, in this instance two degrees of freedom for sanding the surface of the object P, and, on the other hand, that the handgrip must not be connected to the distal end element 7 so that its movements will not be identical to those of the tool 8, so that they can be simpler, and so that the operator can be distanced from the work zone.

It will be noted that the couplings between the movements and the forces of the handgrip 9 and of the tool 8 may advantageously be modified according to the task that is to be performed and/or during the course of this task. It may for example be possible on the robot according to the fourth alternative form of the first embodiment, illustrated in FIG. 5, to use the movement along the eighth axis A8 to modify the boost factor between the movements of the handgrip 9 and of the tool 8, using, for example, a large boost ratio for a coarse initial brushing and a smaller ratio for a more precise finishing pass. This modification may be done continuously or discretely, this being done automatically or contextually, for example on the basis of information from the external measurement system 16, or alternatively may be performed manually by pressing control buttons on the handgrip 9. In this way the work will be able to be begun with a small and fixed distance between the handgrip 9 and the first axis A1 and the second axis A2, which corresponds to a high boost factor. The operator will then be able, when he considers the coarse sanding to be sufficient, to press a control button, which will fix all the movements except for the movement along the eighth axis A8, allowing him thus to increase the distance between the handgrip and the first axis A1 and the second axis A2. The controller 13 will be reconfigured automatically as a result. Once this modification has been made, the operator will be able to release the control button, the distance between the handgrip and the first axis A1 and the second A2 then being fixed once again but higher than before, which corresponds to a lower boost factor suited to the finishing of the brushing. It may also be possible for the robot not to comprise means of modifying the configuration of the robot and of the controller 13, the controller 13 then always being activated in a nominal mode.

Control buttons on the handgrip 9 may also be used for other functions such as for acting on the tool, the clamp or other grippers for example for starting the motor of the rotary brush or for commanding the closure of the aforementioned two-jaw clamp.

It will be noted that, for certain objects P, keeping the tool 8 in contact with said object P and/or keeping the axis A7 of said tool 8 parallel to the plane tangential to the surface of the object P at the point of contact of the rotary brush with said surface of the object P may entail a movement of the second element 2 which will accompany and boost or, on the other hand, oppose, the movement of the handgrip 9 about the second axis A2. In order to avoid that, it is possible either to use the robot only for sanding certain objects P suited to the kinematics of said robot, or to add ranges of movement to the robot, in the main chain of elements or between the main chain of elements and the handgrip 9, or alternatively still, to use a different tool, for example a toric brush in place of the cylindrical brush illustrated in FIGS. 1 to 5. Because contact between a toric brush and the object P is a near-point-contact, such a brush does not require the axis A7 of the tool 8 to be kept parallel to the plane tangential to the surface of the object P at the point of contact with the rotary brush with said surface of the object P and the mobilities about the third axis A3, about the fourth axis A4, about the fifth axis A5 and about the sixth axis A6 can be used to keep the toric brush in contact with the object P at the point targeted by the straight line D (that connects the center of the handgrip 9 to the point of concurrence of the first axis A1 and of the second axis A2) without interfering with the movements of the second element 2 which are controlled by the user.

A second embodiment of the invention will now be described with reference to FIG. 6. Elements that are common to the first embodiment maintain the same numbering increased by one hundred.

The co-manipulation robot according to the second embodiment is dedicated to assisting the operator in drilling holes in an object such as a cylinder-shaped part P of the cockpit of an airplane, these holes being intended to take rivets which will fix this part to other parts of the airplane contiguous therewith. The part P is therefore defined here by a straight line generatrix G along which the part extends and by a circular curved directrix C.

The co-manipulation robot according to the second embodiment comprises a main chain of elements with six degrees of freedom. The main chain of elements is made up of:
  a proximal end element 106 forming a base of the robot,
  a first element 101 mounted on the base 106 so as to be mobile in translation along a first axis B1 of translation with respect to the base 106,
  a second element 102 pivot mounted on the first element 101 about a second axis B2,
  a third element 103 pivot mounted on the second element 102 about a third axis B3,
  a fourth element 104 pivot mounted on the third element 103 about a fourth axis B4,
  a fifth element 105 pivot mounted on the fourth element 104 about a fifth axis B5, and
  a distal end element 107 pivot mounted on the fifth element 105 about a sixth axis B6.

The co-manipulation robot furthermore comprises a secondary chain of elements with three degrees of freedom. The secondary chain of elements is made up of:
  a first body 141 mounted on the first element 101 so as to be able to move translationally along a seventh axis of translation B7, here coincident with the first axis B1, relative to the first element 101,
  a second body 142 mounted on the first body 141 so as to be translationally mobile along an eighth axis B8 of translation relative to the first body 141, and
  a third body 143 mounted on the second body 142 so as to be mobile in translation along a ninth axis B9 of translation relative to the second body 142.

The handgrip 109 is directly connected to the third body 143 so as to be secured to the third body 143. The handgrip 109 therefore has three degrees of freedom, the movement along the seventh axis B7 being a combination of the movements of the first element 101 and of the first body 141.

The tool 108 is secured here to the distal end element 107. In this instance it is a power drill comprising a motorized body and a chuck which holds a drill bit extending along a tenth axis B10 and able to rotate about said tenth axis B10.

Thus, unlike the co-manipulation robot according to the first embodiment illustrated in FIG. 1, in the co-manipulation robot according to the second embodiment, not all of the degrees of freedom are shared by the main kinematic chain (defined as the chain of elements extending from the base 106 to the tool 108) and the secondary kinematic chain (defined as the chain of elements and bodies extending from the base 106 to the handgrip 109). The co-manipulation robot according to the second embodiment therefore has a total number of degrees of freedom that is equal to the sum of the mobilities required for moving the tool 108 (namely six degrees of freedom in this instance in order to be able to drill holes at any arbitrary point on the part P and at any arbitrary orientation) and the handgrip 109 (namely three degrees of freedom here in order to be able to control the essential degrees of freedom for the drilling task, which are a linear movement along the generatrix G, a circular movement along the directrix curve C, and a linear movement perpendicular to the surface of the object P in order to drill the hole). Said robot thus has nine degrees of freedom.

The controller 113 of the co-manipulation robot is configured to couple the movements of the handgrip 109 and of the tool 108.

For this purpose, the control means comprise a first group of drive members: each drive member comprises a motor 150 and a reduction gear 151 associated with said motor 150. Each motor 150 is arranged at one of the mechanical connections in the main chain of elements so as to allow one of the elements of said connection to move relative to the other element of said connection via the associated reduction gear 151. These reduction gears 151 are, for example, cable/drum reduction gears, working in a translational movement in the case of the reduction gear associated with the connection between the first element 101 and the base 106 and working in rotation in the case of all the others. These reduction gears 151 are well known in the prior art and will not be described in detail here. They have the particular feature of being reversible and of having a very high efficiency. Preferably, the motors 150 are iron-free rotor DC motors. It is therefore possible to have a very good estimate of the forces applied to the tool 108 by the cylindrical part P by directly measuring the motor currents. The force measuring means therefore here comprise means of measuring the motor currents (not illustrated here). The displacement measuring means furthermore comprise position sensors 152, each motor 150 being associated with a position sensor 152.

In addition, the control means comprise a second group of drive members: each drive member comprises a motor 153 and a reduction gear 154 associated with said motor 153. Each motor 153 is arranged at one of the mechanical connections in the secondary chain of elements so as to allow one of the elements of said connection to move relative to the other element of said connection via the associated reduction gear 154. These reduction gears 154 may, like with the main chain of elements, be cable type reduction gears and the motors 153 may be ironless rotor DC motors. The force measurement means thus comprise means of measuring the motor currents of the motors of the second group of drive members (which are not illustrated here). The displacement measurement means furthermore comprise position sensors 155, each motor 153 of the second group of drive members being associated with a position sensor 155.

The signals generated by the various position sensors and by the means of measuring the motor current are transmitted to the controller 113 which uses them to control the motors in order to ensure coupling of the handgrip 109 to the tool 108.

For preference, the controller 113 here is configured so that:
  any movement of the handgrip 109 along the seventh axis B7 leads to a movement of the tool 108 along the straight line generatrix G,
  any movement along the ninth axis B9 of the handgrip 109 leads to a movement of the tool 108 along the directrix curve C, and
  any movement along the eighth axis B8 of the handgrip 109 leads to a movement of the tool 108 perpendicular to the cylindrical part P and notably to an advancing movement of the tool 108 toward the cylindrical part P perpendicular to said part (movement allowing drillings to be made in said part).

The three-dimensional translational movements of the handgrip 109 along the seventh axis B7, along the eighth axis B8 and along the ninth axis B9 are thus converted into more complex translational and rotational movements of the tool 108 in six dimensions over the surface of the cylindrical part P and perpendicular thereto, and are furthermore advantageously amplified.

The motors 153 of the second group of drive members may also be controlled by the controller 113, as in the first embodiment, to guide the movements of the operator, for example so that the handgrip 109 is forced to follow a target path that allows the cylindrical part P to be drilled at specific points.

The motors of the various groups of drive members may also be controlled by the controller 113 in such a way that the force exerted by the tool 108 on the cylindrical part P is regulated according to the forces exerted by the operator on the handgrip 109. The force exerted by the tool 108 on the cylindrical part P is for example amplified relative to the force exerted by the operator on the handgrip 109.

The co-manipulation robot according to the second embodiment of the invention therefore provides the operator with assistance in his drilling task.

As indicated, for each hole, the tool 108 needs to be positioned perpendicular to the cylindrical part P then an action needs to be performed along the tenth axis B10 toward said part P.

Traditionally, this task was performed by the operator unaided on large parts of potentially complex geometry. The operator had to make large-amplitude movements, which was tiring. He had also to make large movements of his wrist in order always to be perpendicular to the surface of the cylindrical part P, something that was somewhat unergonomic in certain situations in which the wrist was highly flexed. Finally, he had to apply significant force both to hold the tool 108 and to make the drillings, which was once again tiring.

The co-manipulation robot according to the second embodiment of the invention makes the drilling task far easier for the operator who nevertheless retains sole control of the tool 108, the tool 108 not being moved unless the operator is moving the handgrip 109. The movements of the handgrip 109 are advantageously simpler and smaller in amplitude than those of the tool 108 although the handgrip 109 allows control of the degrees of freedom essential to the drilling task, namely the movement of the tool 108 over the surface of the cylindrical part P and the movement of the tool 108 toward said part P in order to drill it.

In the first embodiment and the alternative forms thereof which are illustrated in FIGS. 1 to 5, the pivot connections between the base 6 and the handgrip 9 make it possible naturally to have a lever arm between the handgrip and the tool 8. Accordingly, it proves to be possible naturally to achieve movements of the tool 8 that are greater in amplitude than those of the handgrip 9 without the need for the robot to have a number of degrees of freedom that is equal to the sum of the mobilities required on the handgrip 9 (namely two in the case of the first embodiment and the alternative forms thereof illustrated in FIGS. 1 to 5) and of the mobilities needed at the tool 8 (namely six for the first embodiment and the alternative forms thereof illustrated in FIGS. 1 to 5). Such a co-manipulation robot therefore has a simpler architecture. Nevertheless, some of the couplings between the handgrip 9 and the tool 8 are imposed mechanically. In the second embodiment, on the other hand, the presence of guideway connections between the base 106 and the handgrip 109 no longer allow the benefit of a natural lever arm to be enjoyed. The co-manipulation robot according to the second embodiment therefore proves to be more complex. However, all of the couplings between the handgrip 109 and the tool 108 can then be managed by the controller 113.

Figure 7:
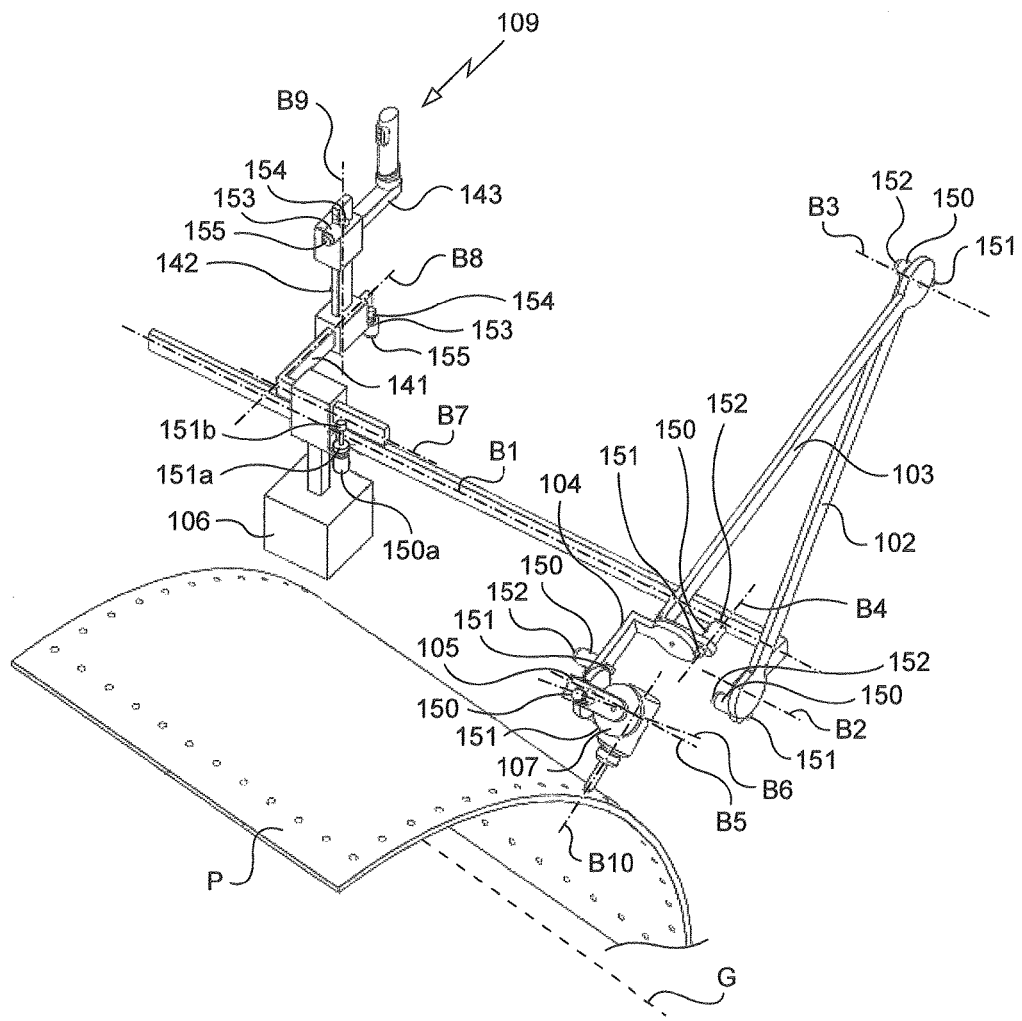
FIG. 7 illustrates a first alternative form of the co-manipulation robot illustrated in FIG. 6.

According to a first alternative form of the second embodiment, illustrated in FIG. 7, some of the couplings between the handgrip 109 and the tool 108 are also imposed mechanically. Thus, the first body 141 of the secondary chain of elements is mounted with the ability to move translationally directly on the base 106 along the seventh axis of translation B7, in this instance parallel to but not coincident with the first axis B1. Furthermore, the robot here comprises only one single motor 150a to allow movement of the first element 101 relative to the base 106 and movement of the first body 141 relative to the base 106. Said motor 150a is arranged in such a way as to drive both the first element 101 via a first reduction gear 151a and the first body 141, via a second reduction gear 151b. By using different reduction ratios for the first reduction gear 151a and the second reduction gear 151b it is possible for the movements of the handgrip and of the tool along the seventh axis B7 and along the first axis B1 respectively to be coupled mechanically and at lower cost.

Figure 6:
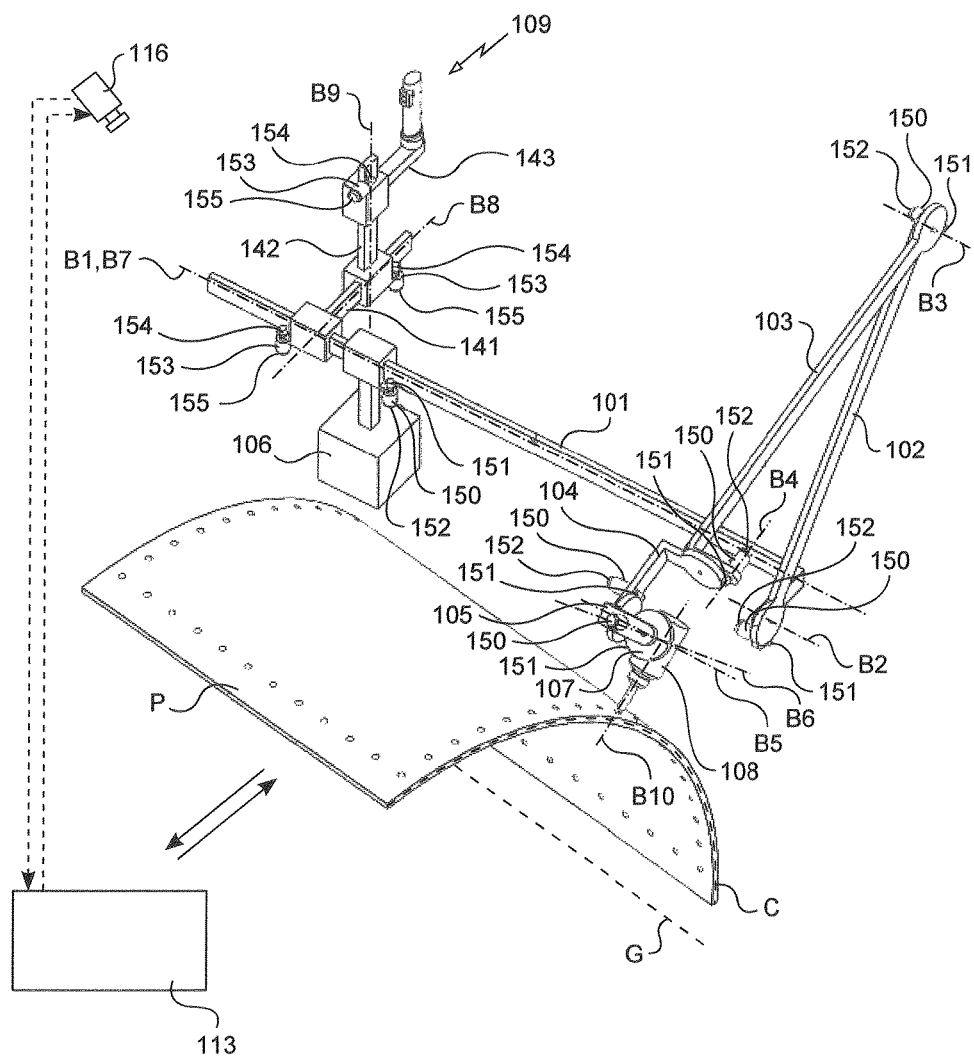
FIG. 6 illustrates a three-dimensional schematic view of a co-manipulation robot according to a second embodiment of the invention.

This first alternative form thus makes it possible to make a saving of one motor with respect to the configuration of the second embodiment illustrated in FIG. 6 (effectively it is then necessary to have a first motor 150 for the translational drive of the first element 101 relative to the base 106 along the first axis B1 and a second motor 153 for the translational drive of the first body 141 relative to the first element 101 along the seventh axis B7). However, the boost ratio between the movements of the tool 108 along the first axis B1 and of the handgrip 109 along the seventh axis B7 is fixed. As a result, the amplification ratio between the movement of the tool 108 along the generatrix G and the movement of the handgrip 109 along the seventh axis B7 is fixed and there is therefore no possibility of modifying this coupling by modifying the parameters of the controller 113 in respect of these movements.

Figure 8:
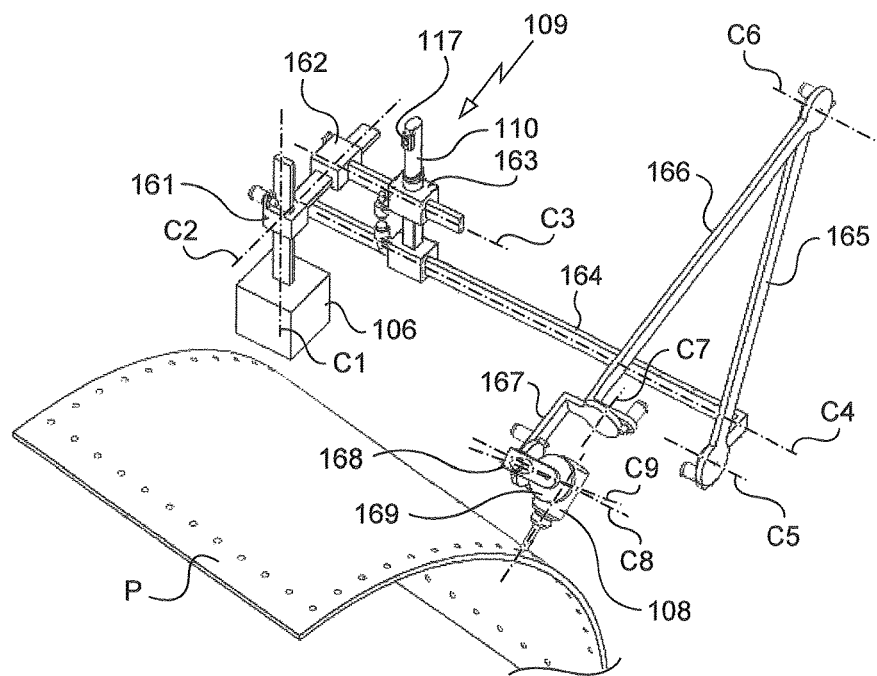
FIG. 8 illustrates a second alternative form of the co-manipulation robot illustrated in FIG. 6.

According to a second alternative form of the second embodiment, illustrated in FIG. 8, the couplings between the handgrip 109 and the tool 108 are completely free, as for the robot according to the second embodiment illustrated in FIG. 6, but the distribution of the mobilities between the main chain of elements and the secondary chain of elements is different. Here, all the movements of the handgrip 109 are performed by the main chain of elements which comprises the nine degrees of freedom necessary for the movements of the handgrip 109 and of the tool 108.

The main chain of elements is then made up of:
a proximal end element 106 forming a base of the robot,
a first element 161 mounted on the base 106 so as to be translationally mobile along a first axis C1 relative to the base 106,
a second element 162 mounted on the first element 161 so as to be translationally mobile along a second axis C2 relative to the first element 161,
a third element 163 mounted on the second element 162 so as to be translationally mobile along a third axis C3 relative to the second element 162,
a fourth element 164 mounted on the third element 163 so as to be translationally mobile along a fourth axis C4 relative to the third element 163,
a fifth element 165 pivot mounted on the fourth element 164 about a fifth axis C5,
a sixth element 166 pivot mounted on the fifth element 165 about a sixth axis C6,
a seventh element 167 pivot mounted on the sixth element 166 about a seventh axis C7,
an eighth element 168 pivot mounted on the seventh element 167 about an eighth axis C8,
a distal end element 169 pivot mounted on the eighth element 168 about a ninth axis C9.

The main chain of elements thus comprises nine degrees of freedom. It allows both for the tool 108 to be moved to any point on the cylindrical part P perpendicular thereto so that the drillings can be made correctly and at the same time for the handgrip 109 to be moved in three degrees of freedom.

The handgrip 109 comprises for example a grasping zone configured as a handle 110 and control buttons 117 arranged on said handle 110. Just as in the second embodiment of the invention, illustrated in FIG. 6, the handgrip 109 is directly connected to one of the elements of the main chain of elements so as to be secured to said element. Here, the handgrip 109 is fixed directly to the third element 163.

The structure of the robot according to the second alternative form of the second embodiment of the invention thus gives the handgrip 109 three degrees of freedom in translation and the tool 108 six degrees of freedom.

In particular, the controller 113 uses the same types of coupling between the handgrip 109 and the tool 108 as for the robot of the second embodiment illustrated in FIG. 6. The controller is thus configured so that:
the movements of the handgrip 109 along the first axis C1 and the third axis C3 lead to a movement of the tool 108 over the cylindrical surface of the part P,
the movements of the handgrip 109 along the second axis C2 lead to a movement of the tool 108 perpendicular to the cylindrical surface of the part P.

The movements of the handgrip 109 are small in amplitude here which makes for ergonomic and reliable manipulation. The movements of the tool 108 are greater in amplitude and allow the handgrip 109 to be reorientated for correct drilling of all the holes.

In this alternative form, the tool 108 has six degrees of freedom with respect to the handgrip 109, making it possible to make the drillings in various types of part and, in particular, in cylindrical parts having a generatrix straight line that is not parallel to the fourth axis C4, to the fifth axis C5 and to the sixth axis C6.

Figure 9:
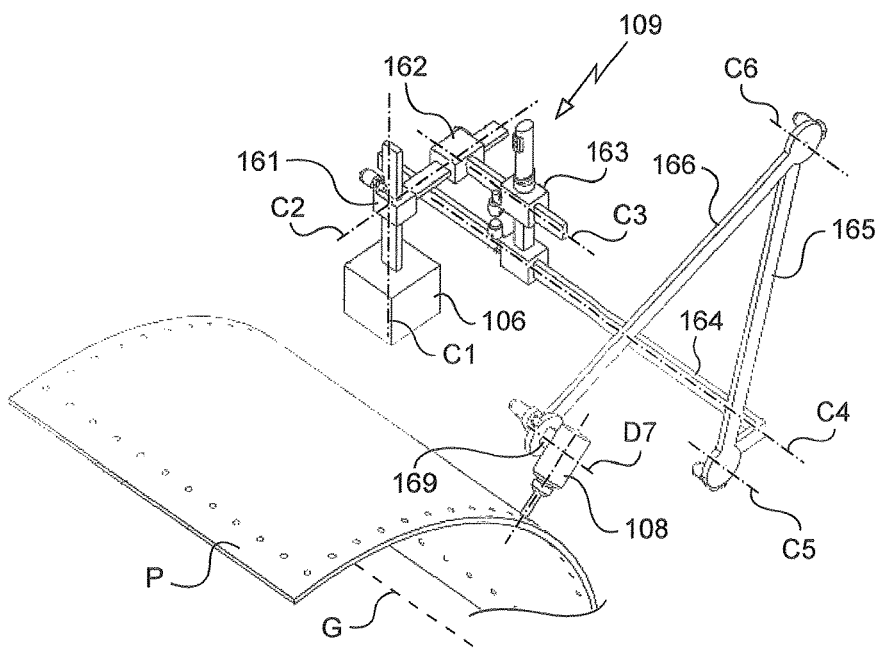
FIG. 9 illustrates a third alternative form of the co-manipulation robot illustrated in FIG. 6.

According to a third alternative form of the second embodiment, illustrated in FIG. 9, the tool 108 has a lower number of degrees of freedom than in the other alternative forms of the second embodiment. Specifically, in this third alternative form, the cylindrical part P is arranged in such a way that its generatrix straight line G is parallel to the fourth axis C4, to the fifth axis C5 and to the sixth axis C6. This being so, the tool 108 needs only to have four degrees of freedom in order for the drilling task to be performed correctly, which means to say in order to be able to make the tool 108 describe a movement along the cylindrical surface of the part P so that the tool 108, and notably the axis along which the drill bit extends, can always be oriented perpendicular to said cylindrical surface and so that a drilling movement can be performed perpendicular to the surface of the part P.

Thus, in the third alternative form of the second embodiment, the robot is configured in such a way that the handgrip 109 has three degrees of freedom relative to the base 106 and that the tool 108 has four degrees of freedom relative to the handgrip 109. Thus, the robot according to this third alternative form of the second embodiment is a redundant robot with four degrees of freedom and seven kinematic connections. Its operational movements allow the tool 108 to be moved in four degrees of freedom and its internal movements allow the handgrip 109 to be used to effect movements different from those of the tool 108 in three degrees of freedom.

To this end, the main chain of elements is made up here of the base 106, of the first element 161, of the second element 162, of the third element 163, of the fourth element 164, of the fifth element 165, of the sixth element 166, as in the second alternative form of the second embodiment. Said chain nevertheless comprises a distal end element 169 which is mounted directly pivoting on the sixth element 166 about a seventh axis D7.

Figure 10:
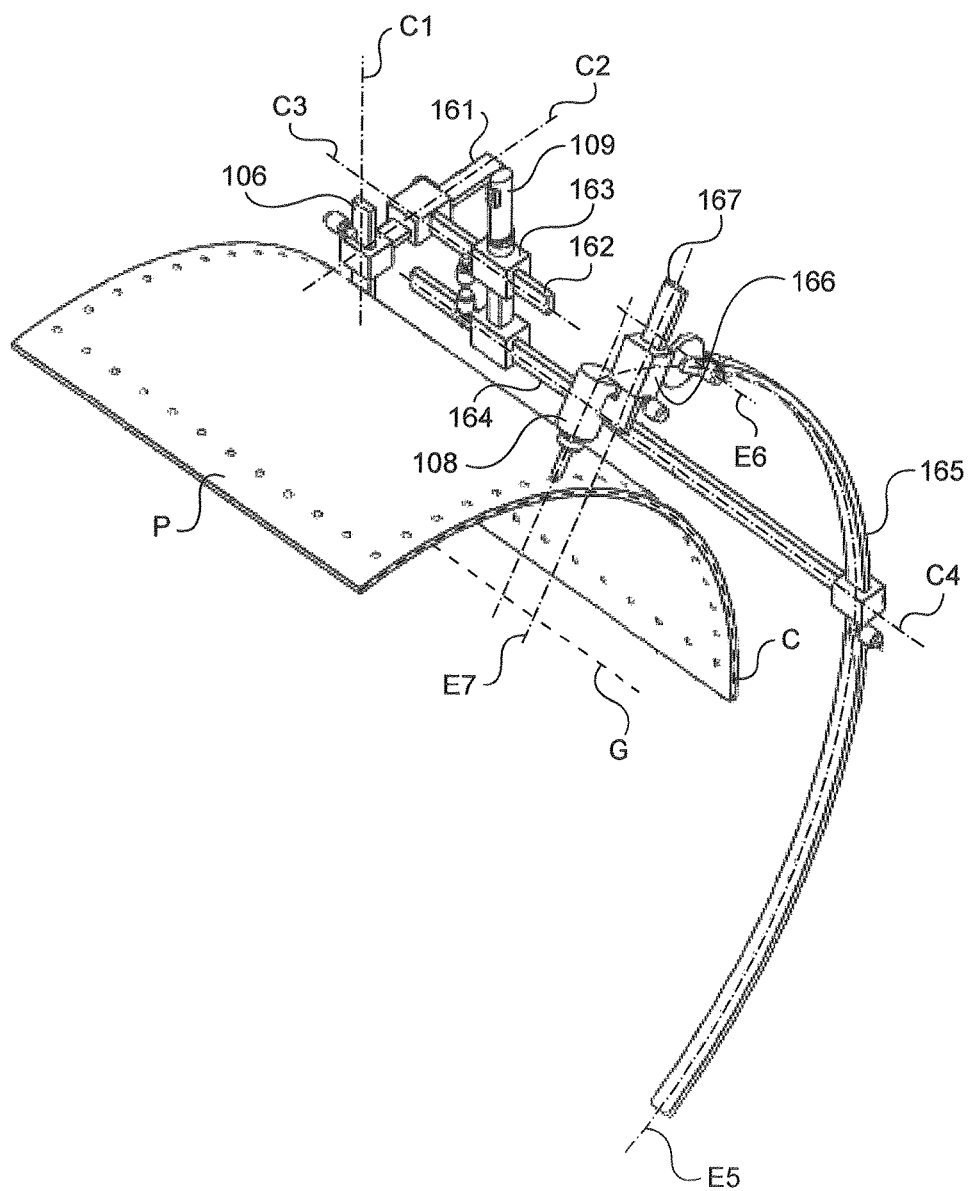
FIG. 10 illustrates a fourth alternative form of the co-manipulation robot illustrated in FIG. 6.

FIG. 10 illustrates a fourth alternative form of the second embodiment, in which the robot is configured more simply.

The main chain of elements comprises a base 106, a first element 161, a second element 162, a third element 163 and a fourth element 164 which are similar to those of the second alternative form of the second embodiment. The chain of elements also comprises a fifth element 165, a sixth element 166 and a distal end element 167 which are arranged differently from those of the second alternative form of the second embodiment. The chain of elements thus comprises:
 a fifth element 165 mounted on the fourth element 164 so as to be mobile relative to the fourth element 164 along a fifth axis E5 which is curved and substantially coaxial with the directrix curve C of the cylindrical part P, the fifth element 165 being configured as a circular guide concentric with said third axis E5,
 a sixth element 166 pivot mounted on the fifth element 165 about a sixth axis E6, this allowing the orientation of the tool 108 to be controlled so as to keep the tool 108 perpendicular to the surface of the cylindrical part P if the fifth axis E5 and the directrix curve C are not perfectly coaxial,
 a distal end element 167 mounted on the sixth element 166 so as to be translationally mobile along a seventh axis E7 relative to the sixth element 166.

If the directrix curve C and the fifth axis E5 are perfectly coaxial, the couplings managed by the controller 113 between the handgrip 109 and the tool 108 prove to be very simple. Specifically, the controller 113 can then control the various drive members of the robot in such a way that:
 a movement of the handgrip 109 along the third axis C3 causes a movement of the tool 108 along the generatrix straight line G along which the part extends,
 a movement of the handgrip 109 along the first axis C1 leads to a movement of the tool 108 about the directrix curve C, the circular movement of the tool 108 then being more complicated than the single-axis translational movement of the handgrip 109,
 a movement of the handgrip 109 along the second axis C2 leads to a movement of the tool 108 along the seventh axis E7.

If the directrix curve C and the fifth axis E5 are not perfectly coaxial, the controller 113 is configured so that the movement of the tool 108 about the sixth axis E6 is coupled with other movements of the tool 108 and/or of the handgrip 109 so as to keep the tool 108 perpendicular to the surface of the cylindrical part P whatever the movements of the tool 108 along the seventh axis E7.

Figure 11:
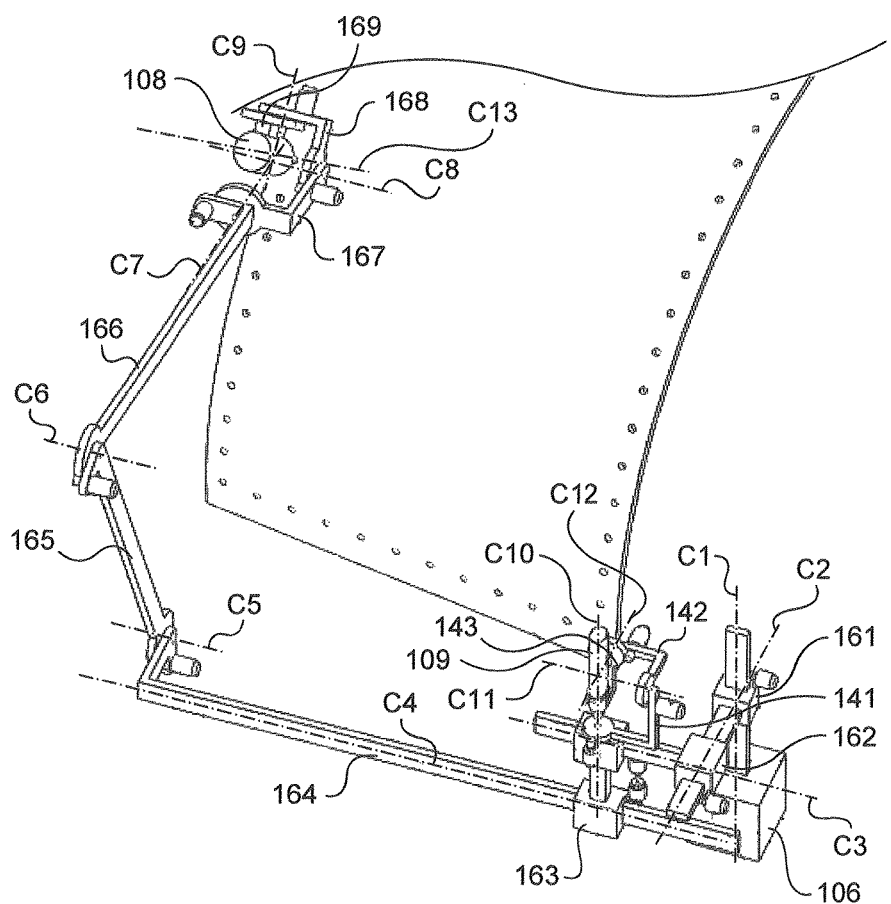
FIG. 11 illustrates a fifth alternative form of the co-manipulation robot illustrated in FIG. 6.

FIG. 11 illustrates a fifth alternative form of the second embodiment in which the tool 108 and the handgrip 109 each have six degrees of freedom and can perform different movements relative to the base 106.

The main chain of elements here is identical to the one illustrated in FIG. 8. By contrast, the robot furthermore comprises a secondary chain of elements having three degrees of freedom. The secondary chain of elements is made up of:
 a first body 141 pivot mounted on the third element about a tenth axis C10,
 a second body 142 pivot mounted on the first body 141 about an eleventh axis C11, and
 a third body 143 pivot mounted on the second body 142 about a twelfth axis C12.

It is therefore possible to have couplings implemented by the controller 113 on the side of the tool 108 but also on the side of the handgrip 109.

On the side of the tool 108, the controller 113 may use the same types of couplings as for the robot according to the second alternative form of the second embodiment, illustrated in FIG. 8. The controller may thus be configured so that:
 the movements of the handgrip 109 along the first axis C1 and the third axis C3 lead to a movement of the tool 108 over the cylindrical surface of the part P,
 the movements of the handgrip 109 along the second axis C2 lead to a movement of the tool 108 perpendicular to the cylindrical surface of the part P.

On the side of the handgrip 109, the controller 113 may for example be configured to keep the handgrip 109 always vertical.

It may even be configured so that the orientation of the handgrip follows that of the tool, and advantageously so that the twelfth axis C12 remains parallel to the axis C13 of the tool (namely the axis along which the drill bit extends and about which said drill bit can turn), the axis of the tool C13 advantageously itself being able to be guided according to the task that is to be accomplished, for example on the basis of information supplied by the external measurement system 116. The ergonomics are enhanced by this.

The operator may advantageously select, using control buttons 117, between a use with a handgrip 109 that is vertical and a use with a handgrip 109 the orientation of which is controlled by the controller 113 as above. Of course, when switching from use with a vertical handgrip 109 to use with a handgrip the orientation of which is controlled by the controller 113, the couplings between the tool 108 and the handgrip 109 are temporarily inactivated for the time it takes for the robot to initialize the coupling formulae. However, the couplings are definitely active outside of these initialization phases whether it is use with a vertical handgrip 109 or use with a handgrip the orientation of which is controlled by the controller 113 that is selected.

Obviously, these couplings are given only by way of example and any other solution may be adopted. This ability to modify the couplings, both at the handgrip end and at the tool end, according to the task to be accomplished and according to ergonomic criteria, is an advantageous feature of the invention.

Of course the second embodiment and the variants thereof described are nonlimiting and modifications may be made thereto without departing from the scope of the invention as defined by the claims.

As may be seen, the robot according to the second embodiment may adopt various configurations and those illustrated are nonlimiting.

Of course, the handgrip may have any other form than the one illustrated and suited to ergonomically being held in the hand.

Likewise, the tool could be of any type suited to the task that is to be accomplished. Just as in the first embodiment, the tool may thus comprise a gripper, such as, for example, a two-jaw motorized clamp, which may act directly on the environment or may carry an instrument such as a power drill. It will also be noted that for certain tasks it may be possible to act on the environment using a passive tool. It may even be possible to act on the environment directly using the clamp or the robotic hand, which means to say that the clamp or the robotic hand will not carry any power drill or other instrument. Finally, in certain cases, it may be possible to act on the environment directly using the distal end element of the robot, no tool, clamp or other gripper then being secured to the distal end element.

Of course, use may be made of any type of reduction gear other than those described and, in particular, reduction gears involving gearwheels, epicyclic reduction gears or gears of the harmonic drive type.

Although here the robot has no multiaxis load cell, the robot could have such cells to supplement or as a replacement for means for measuring motor current.

In addition to the control means, the robot according to the second embodiment may thus comprise passive mechanical coupling means such as gearing, pulleys or cam systems which will make it possible to replace some of the controlled couplings between the tool and handgrip with passive mechanical couplings.

Figure 12:
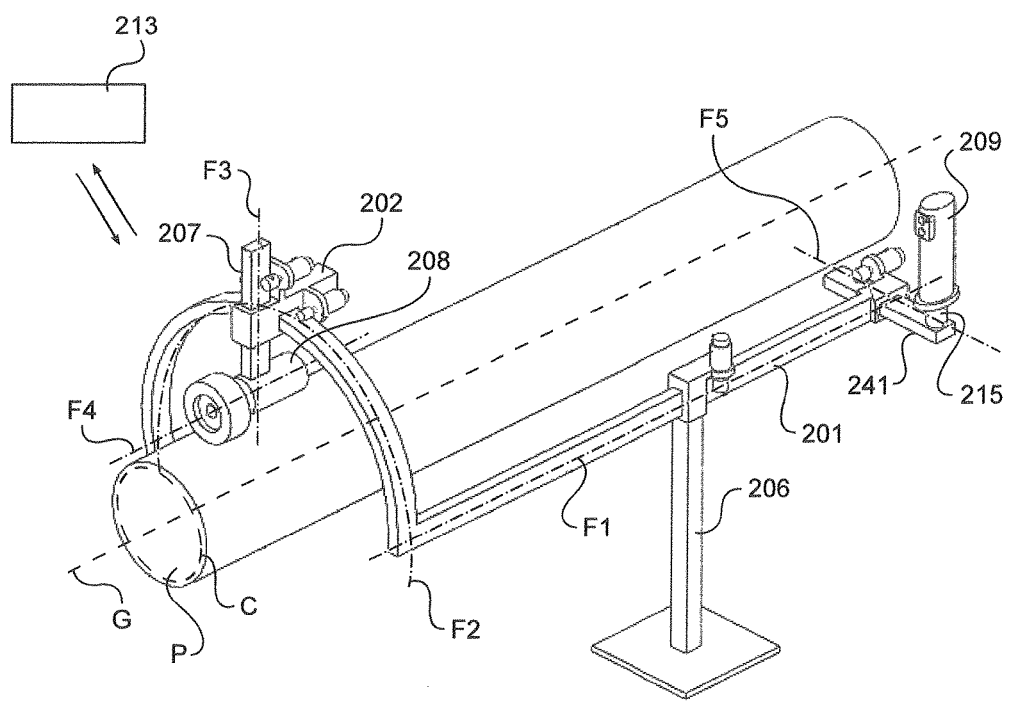
FIG. 12 illustrates a three-dimensional schematic view of a co-manipulation robot according to a third embodiment of the invention.
Figure 13:
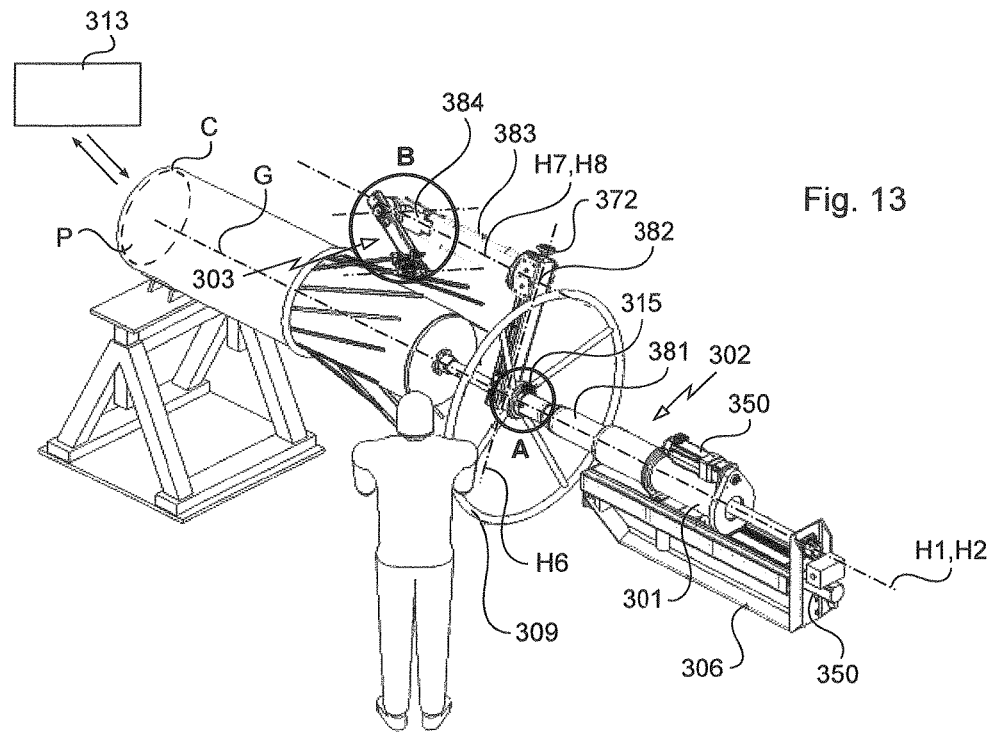
FIG. 13 illustrates a three-dimensional schematic view of a co-manipulation robot according to a fourth embodiment of the invention.

FIG. 12 illustrates a co-manipulation robot according to a third embodiment of the invention in which the control means are configured to couple just some of the movements of the tool 208 in a controlled way with just some of those of the handgrip 209, the movements of the tool 208 being identical to those of the handgrip 209 for the other directions. The elements that are common to the first embodiment maintain their numbering, increased by two hundred.

The robot according to the third embodiment of the invention is intended to assist the operator in a task of brushing an object such as a pipe P. The pipe P is therefore defined by a generatrix straight line G along which the pipe extends and by a circular directrix curve C.

The main chain of elements of the robot here is made up of:

a proximal end element 206 forming a base of the robot, a first element 201 mounted on the base 206 so as to be translationally mobile with respect to the base along a first axis F1, the first axis F1 here being parallel to the generatrix straight line G, a second element 202 mounted on the first element 201 so as to be mobile relative to the first element 201 along a second axis F2 which is curved and substantially coaxial with the directrix curve C, the first element 201 here comprising a portion configured as a circular guide concentric with said curved axis F2 on which the second element 202 is mounted with the ability to move, and a distal end element 207 mounted on the second element 202 so as to be mobile translationally with respect to the second element 202 along a third axis F3.

The tool 208 here comprises a body comprising a motor and a brush rotationally driven by said motor about a fourth axis F4.

The robot further comprises a secondary chain of elements made up of an additional body 241 mounted on the first element 201 so as to be able to move translationally with respect to the first element 201 along a fifth axis F5 here perpendicular and secant to the first axis F1. The handgrip 209 is here connected to said additional body 241 via a multiaxis load cell 215, and therefore has the same degrees of freedom as the additional body 241. The handgrip 209 can thus be moved by the operator in a horizontal plane defined by the first axis F1 and the fifth axis F5.

The robot further comprises, on all these axes, drive members and displacement measurement means which are similar to those of the robot illustrated in FIG. 6.

The movements of the handgrip 209 along the first axis F1 here lead directly to identical movements of the tool 208 along said first axis F1, these movements not being controlled by the controller 213.

For preference, the controller 213 is configured so that on the other axes:

a movement of the handgrip 209 along the fifth axis F5 leads to a movement of the tool 208 about the curved second axis F2, the circular movement of the tool 208 then being more complex than the monoaxial translational movement of the handgrip 209, depending on the forces applied to the handgrip 209 by the operator (which are measured for example by the multiaxis load cell 215 arranged between the handgrip 209 and the additional body 241), the controller 213 regulates the forces exerted by the tool 208 on the pipe P. The force exerted on the pipe P by the tool 208 is, for example, amplified relative to the force exerted by the operator on the handgrip 209 along an axis perpendicular to the axes F1 and F5.

Of course the third embodiment described is nonlimiting and variations can be made thereto without departing from the scope of the invention as defined by the claims.

In particular, the force exerted on the pipe P by the tool 208 may be regulated according to a movement of the handgrip 209 along a sixth axis, perpendicular to the horizontal plane, rather than being regulated according to the forces exerted on the handgrip 209.

A robot according to a fourth embodiment of the invention will now be described with reference to FIGS. 13 to 16. Elements in common with the first embodiment keep their numbering increased by three hundred.

Just like with the co-manipulation robot of the third embodiment, the movements of the tool of the co-manipulation robot are identical to those of the handgrip on certain axes and these movements are coupled on other axes via the control means.

The robot according to the fourth embodiment of the invention is intended to assist the operator in a task that consists in unwinding and bending reinforcing wires initially wound in a helix on an object such as a flexible pipe P of cylindrical shape. The flexible pipe P is therefore defined by a generatrix straight line G along which the flexible pipe extends and by a circular directrix curve C. The bending of the various wires occurs at the interface between the wires and the external layer of the flexible pipe P, which also comprises an internal layer, the wires being positioned between the internal layer and the external layer of the flexible pipe P.

Because the orientation of the wire about its axis and the slippage along this same axis are not controlled during this operation, only five degrees of freedom are required at the tool in order to perform this task. As indicated hereinbelow, these mobilities are provided here by five elements 301, 302, 303, 304 and 307 able to move along or about axes H1, H2, H3, H4 and H5. This movement of bending of the wires is performed in a three-dimensional path around the flexible pipe. It is necessary for the operator to gain control over the progress along this nominal path and to be able to diverge therefrom by making a rotation about the generatrix straight line G. This forward progress and this rotation define the degrees of freedom essential to performing this bending task. There are two of these degrees of freedom and the robot operating member therefore needs to have at least two degrees of freedom.

Thus, the main chain of elements of the robot here consists of:
  a proximal end element 306 forming a base of the robot,
  a first element 301 mounted on the base 306 so as to be translationally mobile with respect to the base 306 along a first axis H1, the first axis H1 here being coincident with the generatrix straight line G,
  a second element 302 pivot mounted on the first element 301 about a second axis H2, the second axis H2 here being coincident with the first axis H1,
  a third element 303 pivot mounted on the second element 302 about a third axis H3,
  a fourth element 304 pivot mounted on the third element 303 about a fourth axis H4,
  a distal end element 307 pivot mounted on the fourth element 304 about a fifth axis H5.

The base 306 is fixed in service while the abovementioned task is being performed. However, the base 306 here is arranged in such a way as to be able to be moved outside of periods in which the robot is in service. The base 306 for example comprises a projecting part intended to extend inside the flexible pipe P, the projecting part then being concentric with the flexible pipe P. Once the robot is in place, which means to say once the projecting part of the base 306 has been introduced into the flexible pipe P, said projecting part is secured to the flexible pipe P so as to prevent any rotation of the flexible pipe P of its own accord about the generatrix straight line G as the wires are unwound and bent around the flexible pipe P.

Specifically, the operating member comprises a handwheel 309. The handwheel 309 here is connected to the second element 302 via a force measuring member 315, which will be detailed hereinbelow, so as to have the same degrees of freedom as the second element 302. The handwheel 309 thus has two degrees of freedom relative to the base 306.

The tool 308 here is directly connected to the distal end element 307 of the robot so as to be secured to said end element.

The tool 308 here comprises a clamp comprising a body 370 and two jaws 371 which are articulated to the body 370. The tool 308 also comprises a trigger associated with two solenoids 372 to control the opening of the clamp. Control over the closing of the clamp here is manual but could as an alternative be automatic.

Thus, when the clamp is opened, a wire can be inserted into it by the operator. Once closed, the body 370 with the two jaws 371 defines two cylindrical orifices inside which the wire extends. The clamp here is configured so that the cylindrical orifices are sufficiently small in diameter that the wire rubs against the walls of the cylindrical orifices while at the same time being sufficiently large in diameter for the wire to be able to rotate about its own axis (which here is substantially coincident with an axis passing through the centers of the two cylindrical orifices) and to be able to slide along said own axis.

For preference, the second element 302 is made up of a plurality of bodies of which the relative positions with respect to one another are adjustable when the robot is not in service.

The second element 302 thus comprises a first body 381 which is pivot mounted on the first element 301 about the second axis H2.

The second element 302 further comprises a second body 382 which is mounted on the first body 381 so as to be translationally mobile along a sixth axis H6 with respect to the first body 381. This translational movement is passive and serves to adapt the configuration of the co-manipulation robot to suit the type of flexible pipe and the type of wire with which the operator is to work. The relative placement of the first body 381 with respect to the second body 382 is performed by the operator using a cranking handle 372 arranged on the second body 382. The movement of the second body 382 with respect to the first body 381 along the sixth axis H6 is, for example, measured by a sensor. Once the desired robot configuration has been reached (position corresponding to the flexible pipe P and to the wires being worked on and which is defined for example by a graph), the first body 381 and the second body 382 are secured, for example in this instance using screws.

The second element 302 comprises a third body 383 which is pivot mounted on the second body 382 about a seventh axis H7 with respect to the second body 382. Once again, this rotation is passive and the relative placement of the second body 382 and of the third body 383 is performed by hand before the robot enters service, the third body 383 and the second body 382 then being secured to one another.

The second element 302 further comprises a fourth body 384 which is mounted on the third body 383 so as to be translationally mobile with respect to the third body 383 along an eighth axis H8, the eighth axis H8 here being coincident with the seventh axis H7. Once again, this movement is passive and the relative placement of the fourth body 384 and of the third body 383 is performed by hand before the robot enters service, the third body 383 and the fourth body 384 then being secured to one another.

Figure 15:
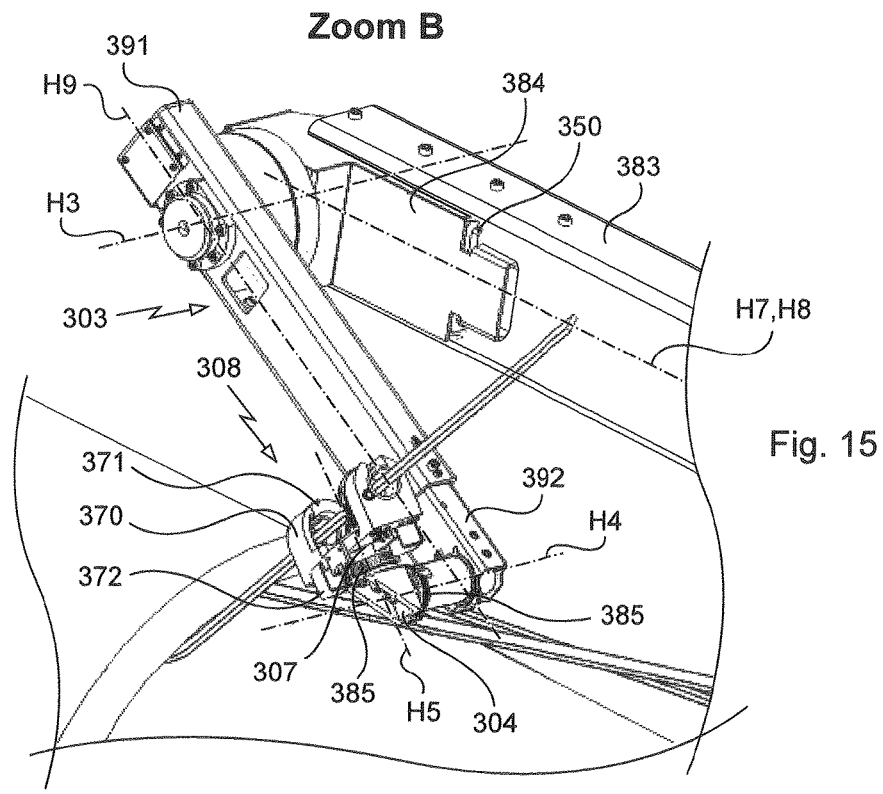
FIG. 15 is a zoom-in on a portion of the robot illustrated in FIG. 13.

For preference, the third element 303 is also made up of a plurality of bodies of which the relative positions with respect to one another are adjustable when the robot is not in service (as is more clearly visible in FIG. 15).

The third element 303 comprises a first body 391 which pivots on the fourth body 384 of the second element 302 about the third axis H3.

The third element 303 further comprises a second body 392 which is mounted on the first body 391 of the third element 303 so as to be translationally mobile along a ninth axis H9 with respect to the first body 391 of the third element 303. Once again, this translational movement is passive and the relative placement of the first body 391 and of the second body 392 is performed by hand before the robot enters service, the first body 391 and the second body 392 then being secured to one another.

The control means comprise motors 350 to motorize the movements of the first element 301 relative to the base 306, of the second element 302 relative to the first element 301, and of the third element 303 relative to the second element 302.

By contrast, no motor is associated with the fourth element 304 and with the distal end element 307 for respectively motorizing the movement of the fourth element 304 relative to the third element 303 and the movement of the distal end element 307 relative to the fourth element 304. The connections between the fourth element 304 and the third element 303, and between the fourth element 304 and the distal end element 307 are therefore not controlled by the controller 313. The main chain of elements here comprises mechanical return means here comprising springs 385, which are respectively associated with each of the aforementioned two articulations, and which are introduced in order to keep the distal end element 307 and the fourth element 304 in neutral positions in the absence of external influences.

The displacement measurement means here comprise position sensors (which are not depicted here), associated with each of the aforementioned motors 350.

The force measurement means further comprise the force measurement member 315 for measuring the forces exerted on the handwheel by the operator, the handwheel 309 being connected to the second element 302 via said force measurement member.

In this instance, the base 306, the first element 301 and the first body 381 of the second element 302 form part of the main chain of elements referred to as the "upstream part" because it is situated upstream of the handwheel 309, while the second body 382, the third body 383 and the fourth body 384 of the second element 302, the third element 303, the fourth element 304 and the distal end element 307 form part of the main chain of elements that is referred to as the "downstream part" because it is situated downstream of the handwheel 309.

Figure 14:
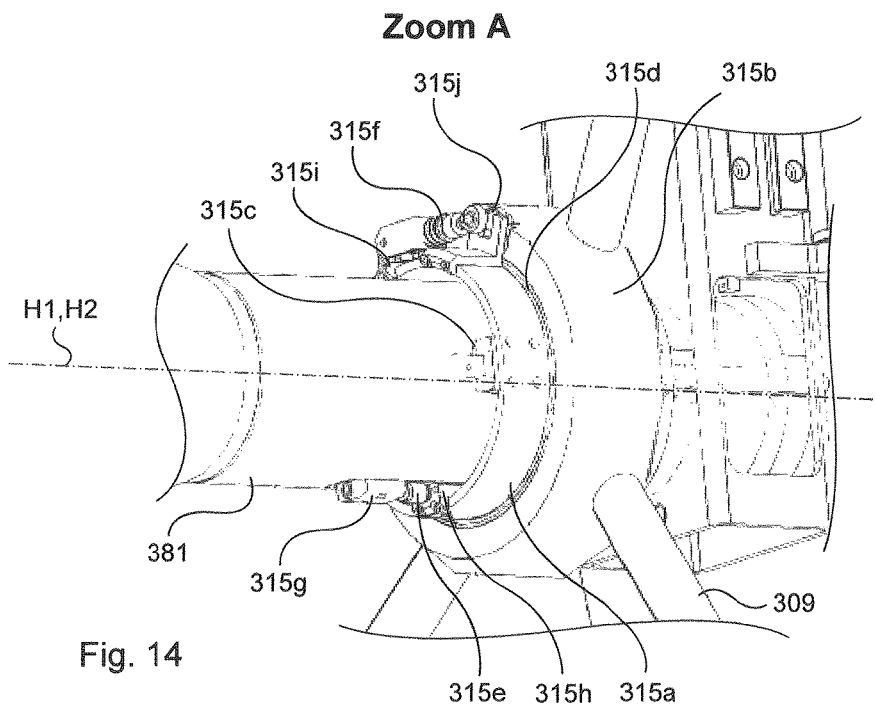
FIG. 14 is a zoom-in on a portion of the robot illustrated in FIG. 13.

As is more clearly visible in FIG. 14, the force measurement member 315 here comprises a first portion 315a mounted on the body 381 of the second element 302 so as to be translationally mobile along the first axis H1 with respect to the second element 302 and a second portion 315b pivot mounted on the first portion 315a about the first axis H1. The very small amplitude translational movements between the first body 381 of the second element 302 and the first portion 315a are realized with the aid of linear ball slides 315c (only one of which is visible in FIG. 14), and the very small amplitude rotational movements between the first portion 315a and the second portion 315b are realized with the aid of thin ball bearings 315d. The handwheel 309 is secured to the second portion 315b.

The force measurement member 315 further comprises a first monoaxis load cell 315e inserted between the first body 381 of the second element 302 and the first portion 315a, and a second monoaxis load cell 315f inserted between the first portion 315a and the second portion 315b. The first cell 315e is fixed to the first body 381 of the second element 302 via a first connecting piece 315g secured to the first body 381 of the second element 302 and to the first portion 315a via a second connecting piece 315h secured to the first portion 315a. The second cell 315f is fixed to the first portion 315a via a third connecting piece 315i secured to the first portion 315a and to the second portion 315b via a fourth connecting piece 315j secured to the second portion 315b. These two monoaxis load cells make it possible to measure the forces applied to the handwheel 309 along and about the first axis H1 and the second axis H2.

The load measurement member 315 is advantageously less expensive than a multiaxis load cell.

In particular, the control means do not have force measurement means arranged at the level of the tool 308 for measuring the forces exerted on the tool 308 by the reinforcing wires that reinforce the flexible pipe P. Specifically, regulating the force applied to the reinforcing wires that reinforce the flexible pipe P is not as important as it is in the sanding tasks that the robot has to perform according to the first embodiment or drilling tasks that the robot has to perform according to the second embodiment of the invention.

For preference, the controller 313 is configured so that:
the movements of the handwheel 309 along the first axis H1 and about the second axis H2 lead to a more complex combined movement of the tool 308, which movement is defined about the generatrix straight line G, and obtained by a combination of the movements of the first element 301, of the second element 302, of the third element 303, of the fourth element 304 and of the distal end element 307 along or about the axes H1 to H5, the movement of the tool 308 being far more complex than that of the handwheel 309 (as is more clearly visible in FIG. 16),
depending on the forces applied to the handwheel 309 by the operator, the controller 313 amplifies the forces exerted by the tool 308 on the reinforcing wires that reinforce the flexible pipe P.

The movements of the tool 308 about the axes H1 to H3 are coupled to the movements of the handwheel 309 along the first axis H1 and about the second axis H2. The movements of the tool 308 about the axes H4 and H5 are themselves operated passively by the environment of the robot, namely in this instance by the reinforcing wires, and by the springs 385. When there is no wire present in the tool 308, the position of the fourth element 304 and of the seventh element 307 and of the tool 308 is imposed by the springs 385. The stiffness of the springs 385 is advantageously chosen so that the return force of these springs 385 is negligible in comparison with the reaction force of the wires on the tool 308, but enough to counter the force due to gravity at the articulations between these elements and the tool 308.

Figure 16:
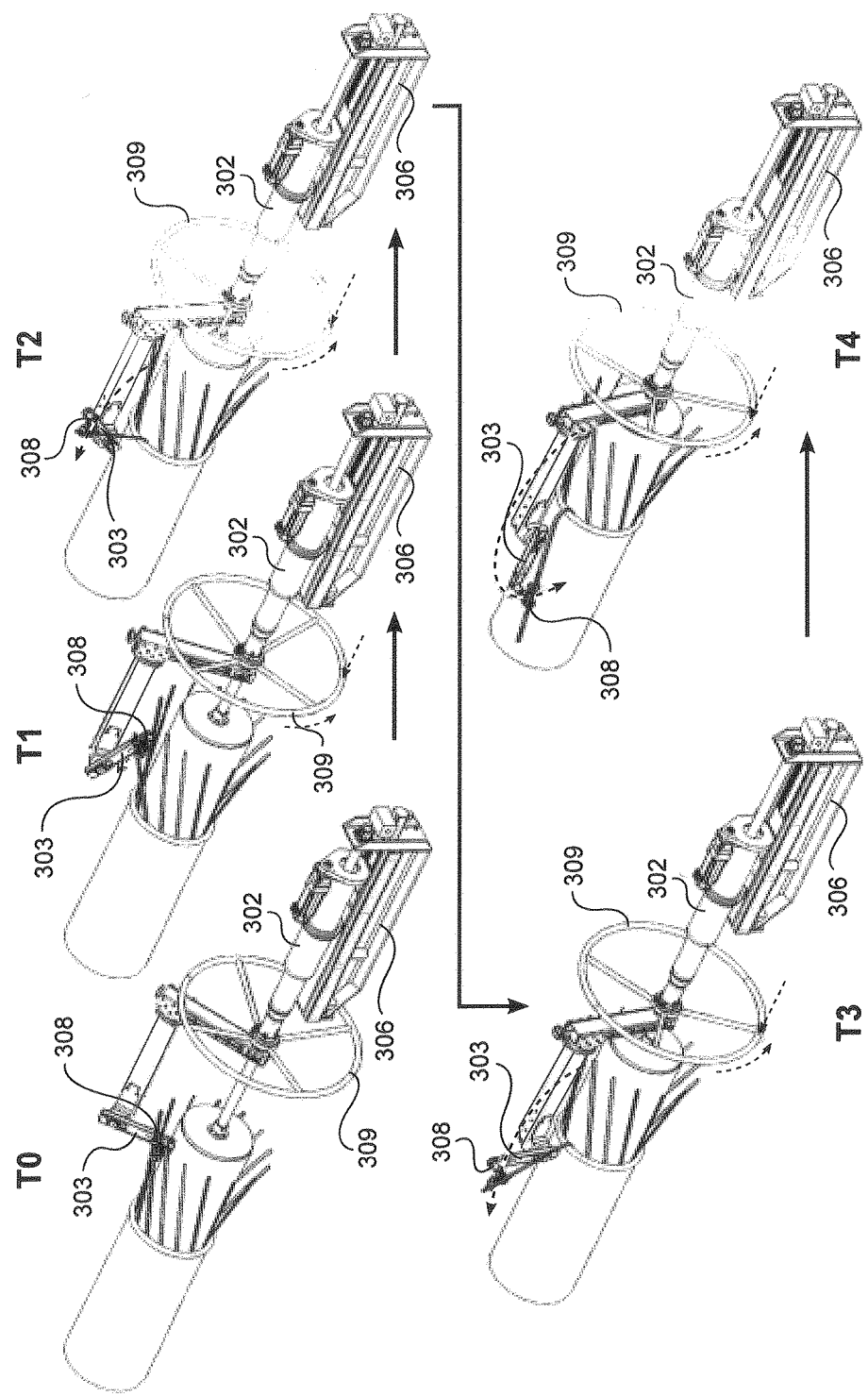
FIG. 16 is a diagram depicting various steps in a bending task performed by the robot illustrated in FIG. 13.

The way in which the robot according to the fourth embodiment of the invention works will now be described with reference to FIG. 16.

At the instant T0, the base 306 is installed and fixed, the various bodies of the second element 302 are fixed to one another and the various bodies of the third element 303 are fixed to one another.

The operator then begins by inserting a wire into the crank which he closes. The operator then turns and advances the handwheel 309.

Progressively, thanks to the coupling by the controller 313 between the handwheel 309 and the tool 308, the tool 308 follows a path which will bend the wire (a little at the instant T1, a little more at the instant T2, even more at the instant T3) so that at the instant T4 the wire is completely bent.

The operator then opens the clamp and performs actions that are the reverse of those performed when bending the wire. The robot then returns to its initial position whereas the wire, which has undergone plastic deformation, remains bent on the flexible pipe P.

The operator then turns the handwheel 309 slightly and repeats the bending operation on another wire of the flexible pipe.

The use of a clamp like the one described hereinabove is advantageous because said clamp allows the relative position between the clamp and the wire to be modified during the course of the task. Thus, the wire is inserted into the clamp at the end of the wire but the clamp will naturally move toward the other end of the wire in order to contribute to bending the wire at the interface between the wire and the flexible pipe P so that the wire undergoes plastic deformation at this interface, which plastic deformation will allow the wire to remain bent on the flexible pipe P even when said wire is no longer clamped by the clamp.

Sometimes the wires do not undergo plastic deformation along their entire length comprised between the interface and the end thereof inserted into the tool 308. Because the deformation of the wires is elastic deformation over part of this length, the wires then offer a not-insignificant opposing elastic force at the end of bending. When that happens, before releasing the wires from the clamp, it is preferable to hold the wires in the bent position on the flexible pipe P, for example using a ring fitted with hooks or by winding an adhesive tape around each wire.

The co-manipulation robot of the fourth embodiment according to the invention assists the operator in his task that involves bending the various wires around the flexible pipe P.

Traditionally, this task was performed manually by the operator. The operator had to grasp hold of the end of the wire and bring it along the flexible pipe P. That required the operator to perform large-amplitude actions and to apply significant force, which was tiring and constituted actions recognized as not being very ergonomical and as being able in the long-term to give rise to musculo-skeletal disorders.

The co-manipulation robot according to the fourth embodiment allows the aforementioned task to be made easier for the operator who nevertheless retains sole control of the tool, the tool not being moved unless the operator is moving the handgrip.

Because of the couplings between movements of the handwheel 309 and of the tool 308, for each of the wires of the flexible pipe P, the operator performs simple and low-amplitude translational and rotational movements whereas the tool 308 executes a complex substantially helical path, of greater amplitude around the flexible pipe. Furthermore, still because of these couplings, for each of the wires of the flexible pipe P, the forces applied by the tool 308 to the wire may advantageously be far higher than those applied to the handwheel 309 by the operator. The forces applied to the handwheel 309 by the operator are therefore markedly lower than the force required to bend the wires.

Furthermore, the operator is distanced from the clamp when the wires are bent by the robot. If said wires were to escape from the tool during the bending step, the elastic snap-back of said wires would not be able to injure the operator. The operator is therefore safer than when the task was performed by hand.

Of course, the fourth embodiment described is not limiting and variations may be made thereto without departing from the scope of the invention as defined by the claims.

Thus, the main chain of elements may comprise two identical downstream parts each carrying a tool so that the two tools are arranged 180 degrees apart. In that way, it will be possible to bend two wires of the flexible pipe P simultaneously, said wires being arranged symmetrically about the flexible pipe P. This principle may be generalized to three or four wires or more.

The robot may further comprise additional ranges of movement. In particular, the robot could be configured so that the second body 382 was pivot mounted on the first body 381 of the second element so that the bodies 382, 383 and 384 of the second element 302 were rotationally mobile relative to the first body 381 of the second element 302 about an axis of rotation parallel to and advantageously coincident with the first axis H1. This additional degree of freedom could be motorized and used to amplify the rotational movement of the downstream part of the main chain of elements of the robot about the first axis H1. This degree of freedom would be particularly advantageous for bending wires with a large helix angle. Specifically, such wires may be wound over several turns and the addition of said degree of freedom would allow the operator to turn the handwheel 309 by only a fraction of a turn whatever the number of turns that the wire needed to effect about the flexible pipe P by means of suitable amplification of this rotation using the control means.

Furthermore, the connections between the various bodies of the second element 302 and the third element 303 could be not passive but motorized so that they could be managed by the controller 313. This would allow more complex coupling between the handwheel 309 and the tool 308.

The amplification of the movement of the tool relative to the flexible pipe P with respect to the advance of the handwheel 309 along the first axis H1 will not necessarily be constant. It could thus be non-linear such that the clamp advances uniformly as the handwheel 309 is progressively pushed by the operator.

Note that it may also be advantageous to be able to rotate the robot freely about the generatrix straight line G at certain moments, particularly at the beginning of the task in order to align the tool with the wire that is to be bent and at the end of the task in order to adjust the radial position of the end of the bent wire for example so that it does not rub against the already bent adjacent wires or so that the wire can be engaged into a retaining member on the flexible pipe P, such as into a hook of a retaining ring as mentioned hereinabove. This may be achieved by blocking the movement of the first element 301 along the first axis H1 using the first motor 350 (associated with the connection between the first element 301 and the base 306), the handwheel 309 then no longer being able to be moved except in rotation about the second axis H2. Such rotation may be assisted by the second motor 350 (associated with the connection between the first element 301 and the second element 302) in order to limit the forces applied by the operator to the handwheel 309. The handwheel would then advantageously be provided with control buttons so as to be able to switch from one assistance mode to another.

Figure 17:
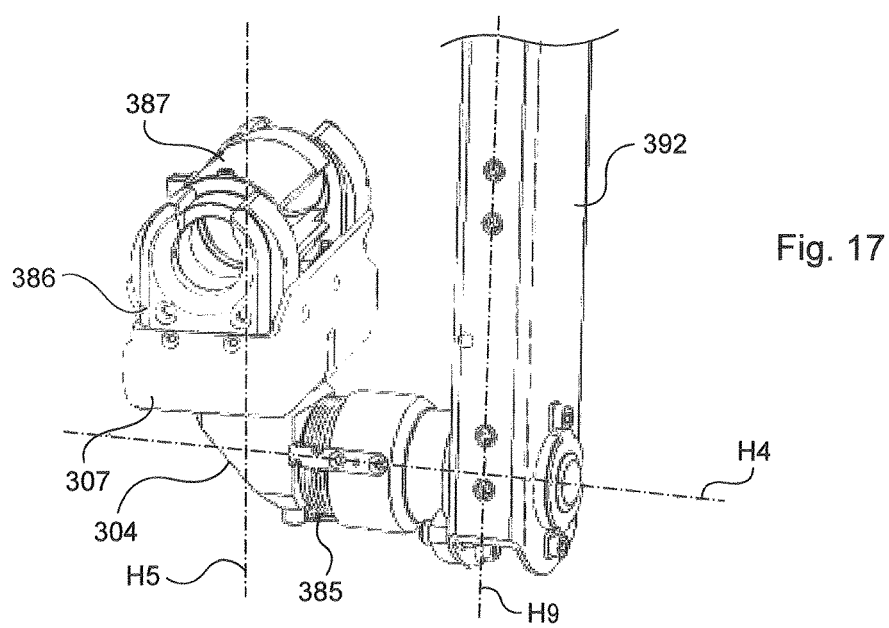
FIG. 17 illustrates an alternative form of the tool for the robot depicted in FIG. 13.

Of course, any other type of tool than the one illustrated could be used, such as, for example, a conventional clamp that immobilizes the wire or even a dexterous gripper. FIG. 17 thus illustrates an alternative form of the tool illustrated in FIGS. 13 to 16. In this alternative form, the tool 308 comprises just one single jaw 387 which, when closed, with the body 386 of the tool 308 forms a single cylindrical guide. Such a tool 308 requires just one solenoid to control its opening, thereby simplifying its design.

One example of a controller that can be associated with any embodiment or any variant described hereinabove will now be described with reference to FIGS. 18 and 19. In general, the controller of the invention has the role of regulating the control of the drive members according to a predefined strategy and according to the signals transmitted by the force and/or displacement measurement means and possibly an external measurement system. For preference, the controller of the invention has the role of installing couplings between the various drive members in order to allow coordination of the various axes of the main and secondary chains of elements so as to ensure that the task that is to be accomplished is executed correctly while at the same time simplifying the actions of the operator and possibly giving him force feedback. The controller may also be used to implement functions of guiding the actions of the operator and of assisting him with force.

Considering the case of the robot according to the fourth embodiment, illustrated in FIGS. 13 to 16, the role of the controller 313 is to coordinate the movements of the various elements of the main chain of elements along the first axis H1, the second axis H2 and the third axis H3, which are the three motorized axes of the robot, according to the movements of the robot and the forces applied to the handwheel 309 by the operator so as to bend the wires correctly, to provide the forces necessary for bending these wires by amplifying the forces supplied by the operator, and to guide, over the portion of path that imposes the plastic deformation of the wire, the movements of the operator in order to ensure the quality and repeatability of the bending action.

Figure 18:
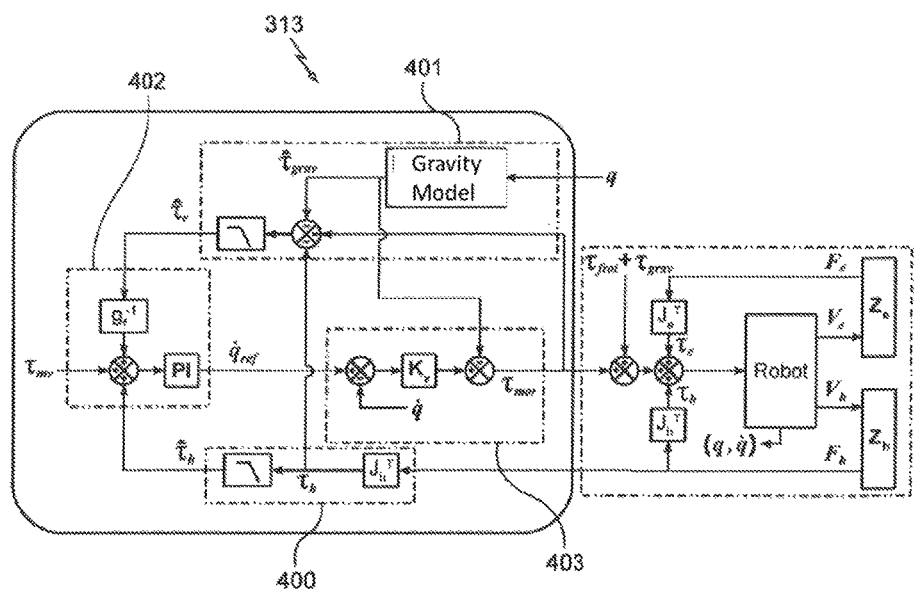
FIG. 18 illustrates a control program executed by the controller of the robot depicted in FIG. 13.

In particular, with reference to FIG. 18, the controller 313 may execute the following control program that allows the forces applied to the handwheel 309 by the operator to be amplified.

The robot according to the fourth embodiment is in contact with its environment via two interaction ports, the first at the handwheel 309 with the operator and the second at the tool 308 with the wire. Thus, any movement $V_h$ of the handwheel generates in return a force $F_h$ of reaction of the operator, the behavior of said operator being likened to his mechanical impedance $Z_h$, it also being possible for the operator deliberately to apply an additional force to the handwheel 309. Likewise, any movement $V_e$ of the tool 308 in turn generates a force $F_e$ of reaction of the reinforcing wire on the tool 308, which reaction force is dependent on the mechanical impedance $Z_e$ of said wire. This impedance, just like that of the operator $Z_h$, is theoretically passive. The force $F_h$ applied by the operator to the handwheel 309 is projected onto each actuated mechanical connection of the main chain of elements in the form of a torque vector $\tau_h$. For that, all that is required is for the loading $F_h$ to be multiplied by $J_h^T$, the jacobian transpose matrix of the robot, both expressed at the level of the handwheel 309. Similarly, the force $F_e$ applied by the reinforcing wire of the flexible pipe P to the tool 308 is projected onto each actuated mechanical connection of the main chain of elements in the form of a torque vector $\tau_e$. For that, use is made of $J_e^T$, the jacobian transpose matrix of the robot expressed at the level of the tool 308. The articulations of the co-manipulation robot are subjected to these forces but are also subjected to the torque vector $\tau_{mot}$ of the various motors 350, to the frictions $\tau_{fr}$ and to the gravitational torques $\tau_{grav}$ generated at the various mechanical connections of the main chain of elements. These forces, torques, frictions and gravitational torques combine and govern how the configuration of the robot evolves.

The force assistance is obtained by a force augmentation loop implemented within the controller 313. Said loop here is advantageously configured so as to make it possible to dispense with a direct measurement of the force at the level of the tool 308.

Said loop here comprises:
- an estimator 400 of the joint torques of the force $F_h$ applied by the operator to the handwheel 309, also referred to as the operator force,
- an estimator 401 of the joint torques of the force $F_e$ applied by the reinforcing wire of the flexible pipe P to the tool 308, also referred to as effector force,
- a force augmentation corrector 402, and
- an internal speed loop 403.

The estimator 400 of the joint torques of the operator force has, as input, the operator force $F_h$ (or, at minimum, the measured useful components thereof) and multiplies it by the matrix $J_h^T$ in order to obtain $\tau_h$. It applies to the result obtained a low-pass filter in order to obtain $\hat{\tau}_h$, the estimate of $\tau_h$.

The estimator 401 of the joint torques of the effector force calculates first of all, from the position measurements q (which means to say from the measured positions q of the various elements of the main chain of elements), using a gravity model, the estimate $\hat{\tau}_{grav}$ of the gravitational torques. The estimator 401 then adds $\hat{\tau}_{grav}$ and $\tau_h$ to the torque vector of the motors $\tau_{mot}$ before applying a low-pass filter to the result of the addition, which low-pass filter will advantageously be chosen to be identical to the one used in the estimator 400. Finally, the estimator 401 inverts the sign in order to obtain $\hat{\tau}_e$, the estimate of $\tau_e$.

Within the force augmentation corrector 402, $\hat{\tau}_e$ is divided by the desired force augmentation gain $g_f$ before being added to $\hat{\tau}_h$ and $\tau_{mv}$, which is the joint torque of a virtual coupling mechanism the purpose of which will be described later on. The result of this addition constitutes the input to a proportional integral corrector PI which then generates reference speeds $\dot{q}_{ref}$ for the various elements of the main chain of elements.

An internal speed loop 403, of the proportional type, is also implemented in the controller 313. Said speed loop 403 has, as its inputs, the actual speeds $\dot{q}$ of the various elements of the main chain of elements, as calculated for example from the signals geneated by the position sensors, and the reference speeds $\dot{q}_{ref}$. The actual speeds $\dot{q}$ are subtracted from the reference speeds $q_{ref}$ and the result is then multiplied by a proportional gain $K_v$ in order to supply, after the subtraction of $\hat{\tau}_{grav}$, the aforementioned motor torques $\tau_{mot}$.

The reference motor torques $\tau_{mot}$ are added to the friction torques $\tau_{fr}$ and to the gravitational torques $\tau_{grav}$, then to the torques $\tau_h$ and $\tau_e$ described hereinabove, making it possible from this to deduce the total torques applied to the robot and governing how it evolves.

In particular, in the state of equilibrium of the control program described, the following relationship is observed: the sum of the motor torques $\tau_{mot}$, of the friction torques $\tau_{fr}$, of gravitational torques $\tau_{grav}$ and of the torques $\tau_h$ and $\tau_e$ is equal to zero, namely:

$$\tau_{mot}+\tau_{fr}+\tau_{grav}+\tau_e+\tau_h=0 \qquad (1)$$

Moreover, in the state of equilibrium, the input to the proportional integral corrector PI of the force loop 402 is zero, namely:

$$\hat{\tau}_e \times g_f^{-1} \hat{\tau}_h + \tau_{mv}=0 \qquad (2)$$

Assuming that, in the state of equilibrium, the estimates are ideal:

$$\hat{\tau}_e = -\tau_{mot} - \tau_{grav} - \tau_h \quad (3)$$

$$\hat{\tau}_h = \tau_h \quad (4)$$

By combining the aforementioned four relationships, in the state of equilibrium, the following overall relationship is observed:

$$(\tau_h + \tau_{mv}) \times g_f + \tau_{fr} + \tau_e = 0$$

The overall relationship means that in equilibrium and in the absence of coupling with a virtual mechanism ($\tau_{mv}=0$), the force applied by the reinforcing wire to the robot at the level of the tool 308 is, disregarding the sign, the same as that applied by the operator to the handwheel 309, amplified by a gain $g_f$ to which the friction in the various mechanical connections is added.

The speed loop 403 which receives the reference from the force loop 402 is advantageously implemented at the lowest level of the control program described with a minimum cycle time and a maximum gain, thereby making it possible to linearize the robot behavior as far as possible and thus improve robot stability. This speed loop may advantageously be implemented by commercially available variators, since such variators generally offer this functionality.

It will be noted that if the gain $g_f$ chosen is greater than or equal to 1, it is possible to regulate the proportional integral corrector PI in such a way that the robot respects the criterion of unconditional stability in coupled mode irrespective of the choice of gain $g_f$. Said robot slaved in this way respects this criterion notably if the handwheel 309 has a passive behavior (i.e. if it does not feed back to the operator more energy than it receives therefrom) whatever the passive object with which the tool 308 is interacting and vice versa. However, it may be noted that, even when this criterion is respected, the stability of the robot is guaranteed only when there is no direct interaction of the operator simultaneously on the handwheel 309 and the rest of the robot (notably on the tool 308). As a result, during the phase of manual insertion of the wire into the clamp, it may prove necessary, in order to ensure the safety of the operator, for the control program to be inhibited. This may be controlled for example via a control button placed on the handwheel 309 or on the main chain of elements of the robot or via an automatic control based on the information supplied by an external measurement system such as the external measurement system illustrated in FIG. 6.

Figure 19:
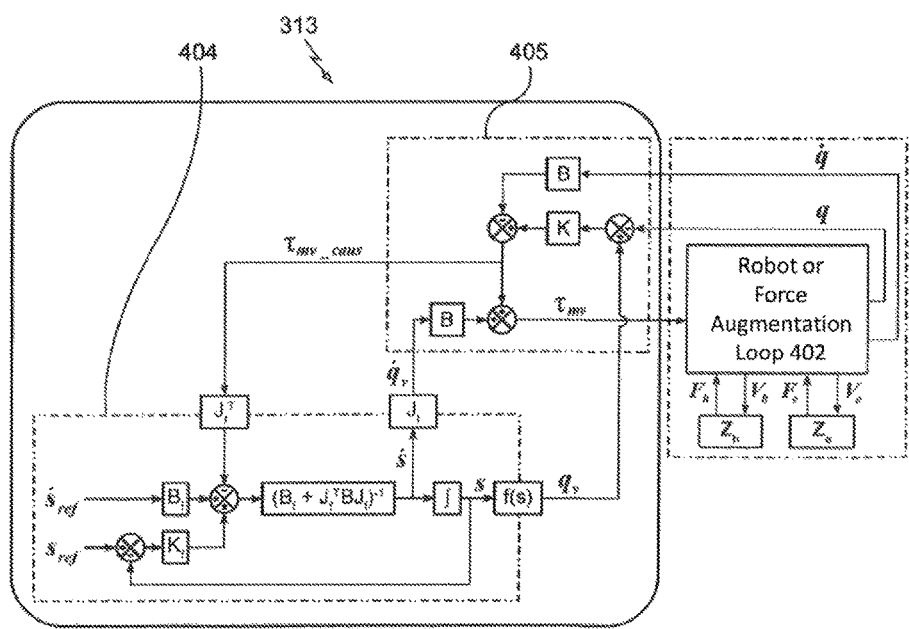
FIG. 19 illustrates another control program executed by the controller of the robot depicted in FIG. 13.

In particular, with reference to FIG. 19, the controller may execute the following control program which makes it possible to make the robot follow a complex path defined by a virtual guide in space on the basis of a simpler movement of the operator on the handwheel 309.

The principle of operation of this control program is as follows.

If p is the number of degrees of freedom of a simulated virtual mechanism 404 which is implemented in the controller 313 and which makes it possible to simulate the movements that the main chain of elements is to follow and if n is the number of actual motorized degrees of freedom of the robot (three in the case of the fourth embodiment), coordination between the mechanical connections of the tool 308 and those of the handwheel 309 is described by the following mathematical application:

$$f: \mathbb{R}^P \to \mathbb{R}^n$$

which associates with the position $s \in \mathbb{R}^P$ of the virtual mechanism, expressed in its own joint space, the reference position $q_v \in \mathbb{R}^n$ of the main chain of elements, expressed in the joint space of the robot.

It is in particular possible to define certain degrees of freedom of the joint virtual mechanism using paths:

$$f(s) = \Sigma_{i=1}^P f_i(s_i) \text{ with } f_i: \mathbb{R} \to \mathbb{R}^n$$

the paths $f_i$ may for example be defined by interpolation polynomials or splines. In that case, the interpolation points are, for example, determined during a manipulation of the robot in a configuration mode that allows its controlled joints to be moved freely. This configuration mode may, for example, be run by a gravity compensation control well known in the prior art and which will not be detailed here.

For the robot according to the fourth embodiment it is possible for example to define f as follows:

$$f(s) = f_1(s_1) + [0; s_2; 0]$$

the path $f_1$ being the nominal path generated by a monotonic spline function passing through four points that are determined during a manipulation of the robot: the first point in the position of grasping a reinforcing wire, the second point in an intermediate position that allows said wire to be disengaged from the other reinforcing wires, the third point in a position of passing said wire over the bend point for said wire and the fourth point in a position of end of bending of said wire in contact with the surface of the flexible pipe P. Thus, the degree of freedom $s_1$ represents the advancing of the tool 308 along the nominal path and the degree of freedom $s_2$ allows this path to be shifted in a rotation about the generatrix straight line G of the flexible pipe P which in this instance is aligned with the second axis H2.

In order to follow the path defined by the simulated virtual mechanism 404, the actual joint positions q of the various elements of the main chain of elements and the actual joint speeds $\dot{q}$ are slaved to the reference joint positions and the reference joint speeds $q_v$ and $\dot{q}_v$, the reference joint speeds $\dot{q}_v$ being obtained by multiplying the speeds $\dot{s}$ of the virtual mechanism, which are expressed in their own joint space by the jacobian matrix $J_F \in \mathbb{R}^P \times \mathbb{R}^n$ of the application f for the current position of the virtual mechanism s. This slaving is performed here using a corrector of the proportional derivative type PD, which can be likened to a system of the imaginary spring/damper type of stiffness K and viscosity B (K and B being diagonal matrices that can be likened to the stiffnesses and viscosities of the joints of said imaginary system). For this, a coupling 405, implemented in the controller 313, uses as input: the reference joint positions $q_v$, the reference joint speeds $\dot{q}_v$, the actual joint positions q and the actual joint speeds $\dot{q}$. The coupling 405 notably supplies at output the vector of the joint torques of coupling to the virtual mechanism $\tau_{mv}$ that needs to be applied to the input of the force augmentation loop 402 described previously (or that needs to be applied directly to the motor torque vector $\tau_{mot}$ of the various motors 350, adding to it the friction torques $\tau_{fr}$ and the gravitational torques $\tau_{grav}$ if the force augmentation functionality is not required) in order to follow the movements imposed by the virtual mechanism, the advance along this mechanism being controlled by the actions of the operator on the handwheel 309. The movements of the robot are governed by these motor torques and by Fh and Fe.

More specifically, within the coupling 405, the calculation of the joint torques of coupling to the virtual mechanism $\tau_{mv}$ is obtained by the following calculation:

$$\tau_{mv} = K \times (q_v - q) + B \times (\dot{q}_v - \dot{q}) \quad \text{(equation 1)}$$

It will be noted that in order to make the virtual mechanism move at the same time as the robot, the causal part of the coupling force $\tau_{mv\_caus}$ is also calculated within the coupling 405 using the following equation:

$$\tau_{mv\_causal} = K \times (q_v - q) - B \times \dot{q} \quad \text{(equation 2)}$$

The simulated virtual mechanism 404 has zero inertia and is subjected to a viscoelastic return force returning toward reference coordinates $s_{ref}$. The force equilibrium equation can be written then as follows:

$$0 = J_f^T \times \tau_{mv} + K_f \times (s - s_{ref}) + B_f \times (\dot{s} - \dot{s}_{ref}) \quad \text{(equation 3)}$$

$J_f^T \times \tau_{mv}$ corresponds to the coupling force of the virtual mechanism projected onto its own joint space;

$K_f$ and $B_f$ are the diagonal matrices that can be likened to the stiffnesses and viscosities for the return of the virtual mechanism toward its reference position $s_{ref}$;

$\dot{s}_{ref}$ represents the derivative of $s_{ref}$ with respect to time.

More specifically, within the coupling 405, the calculation of how the status of the virtual mechanism evolves, which means to say of how its position s changes, is obtained by isolating its derivative $\dot{s}$ in the terms of equation 1 and equation 3. In order to do that, equation 1 may be written in the form:

$$\tau_{mv} = \tau_{mv\_causal} + B \times J_f \times \dot{s} \quad \text{(equation 4)}$$

By substituting this expression for $\tau_{mv}$ into equation 3 we get:

$$0 = J_f^T \times (\tau_{mv\_caus} + B \times J_f \times \dot{s}) + K_f \times (s - s_{ref}) + B_f \times (\dot{s} - \dot{s}_{ref})$$

Which, by isolating s, makes it possible to obtain the differential equation that governs the movement of the virtual mechanism:

$$\dot{s} = (B_f + J_f^T \times B \times J_f)^{-1} \times (K_f \times (s_{ref} - s) + B_f \times \dot{s}_{ref} - J_f^T \times \tau_{mv\_caus}) \quad \text{(equation 5)}$$

$(B_f + J_f^T \times B \times J_f)$ still being invertible because B is defined as positive, $B_f$ is semi-defined as positive and $J_f$ is full rank.

Equation 5 that governs the movement of the virtual mechanism is an ordinary differential equation. All the terms on the right-hand side can be expressed as a function of the inputs of the controller 313 and of the position s. By integrating equation 5 in real time the specific joint position s of the virtual mechanism 404 at each instant can be determined. Integration of equation 5 can be performed by any numerical integrator, such as for example by using the explicit Euler method.

In practice, it is possible to choose the values of the diagonal matrices K and B such that the robot is passive whatever the virtual mechanism 404. This regulation is performed for example in such a way as to maximize the stiffness K of coupling of the virtual mechanism, thereby affording maximum precision.

The control law described hereinabove makes it possible to create the virtual guide in the joint space of the robot rather than in Cartesian space. This offers the advantage, notably in the case of the robot according to the fourth embodiment of the invention in which the desired path for each reinforcing wire needs to be repeated all around the flexible pipe P, of allowing a simplified description of the desired couplings/guidances. Guidance in the joint space also advantageously makes it possible to circumvent problems encountered with guidance in Cartesian space when the robot oversteps individual configurations or has redundancy in certain degrees of freedom.

Of course the invention is not restricted to the embodiments described and embodiment variations may be applied thereto without departing from the scope of the invention as defined by the claims.

Of course the robots illustrated here are given merely by way of examples and any other robot as defined hereinbelow falls within the scope of the invention: co-manipulation robot comprising:

a first chain of elements which comprises a proximal end element forming a base of the robot and a distal end element, the various elements being mounted with the ability to move with respect to one another so that the distal end element can be moved relative to the proximal end element, at least one robot operating member, said member being connected to one of the elements of the first chain of elements other than the distal end element, and being designed to be able to be moved directly by an operator relative to the proximal end element, control means for control of at least part of the first chain of elements and of the operating member, the first chain of elements, the operating member and the control means being configured in such a way that at least one movement of the operating member relative to the proximal end element according to at least one degree of freedom of the operating member has associated with it a more complex movement of the distal end element relative to the proximal end element in at least one of the degrees of freedom of the distal end element.

In particular, the operating member may adopt any form suited to being grasped and handled ergonomically. It may for example and nonlimitingly comprise a handgrip, a pen, a stick for example of the joystick type, a clamp or a ball. The operating member may be configured to be grasped in one or both hands. It may also be hollow so that the operator can insert one or more fingers or the palm of his hand or his arm therein.

As has been mentioned, it will be possible to connect the operating member to any element of the main chain of elements other than the distal end element, either directly (in which case the operating member is linked to an element of the main chain of elements in such a way as to have the same degrees of freedom of said element) or via a secondary chain of elements. Furthermore, the operating member may be linked to an element of the main chain of elements or to an element of the secondary chain of elements either by securing the operating member to the element concerned or via force measurement means such as a load cell or a force measurement member. The only limitations are:

that the operating member be mobile relative to the base with a sufficient number of degrees of freedom to perform the elementary movements necessary for executing the task;

that the operating member not be connected to the distal end element, in order to keep the operator sufficiently distant from the tool.

For preference, the choice of element from which the secondary chain of elements extends or to which the operating member is connected will take three distinct criteria into consideration:

the mechanical simplicity of the robot: the secondary chain of elements will be connected or the operating member will be connected to the element of the main chain of elements that is as far as possible away from the base so as to share the maximum possible number of degrees of freedom between the operating member and the tool. For preference, the operating member will be connected directly (or possibly via force measurement means) to the element of the main chain of elements that has the number of degrees of freedom required for the task that is to be performed. In that case, there will actually be no need for a secondary chain of elements.

The ergonomics of manipulating the operating member: specifically it is appropriate to avoid the operating member having to be manipulated using large-amplitude movements.

The distancing of the operator from the tool: it is also appropriate to avoid the operating member being too close to the tool and therefore to the distal end element.

Likewise, the tool may be of any type suited to the task that is to be accomplished.

It will be possible to connect the tool to the distal end element either directly (the tool then being fixed and secured to said element) or via force measurement means such as a load cell or a force measurement member (the tool then being linked to said element in such a way as to have the same degrees of freedom as said element).

Although here the tool is always in contact with the object in order to perform the task that is to be accomplished, it is possible to have a tool that does not constantly come into contact or that never comes into contact with the object in order to perform the task that is to be accomplished, and therefore a tool that does not apply force to said object, or does not do so constantly. Thus, the tool may for example comprise a checking device that makes it possible to check that welds have been performed correctly on the object, the object for example being the hull of a boat. The tool is thus moved around a constant distance away from the surface of the hull in an orientation that is controlled with respect to this hull but without ever coming into contact with the hull. In this case, the coupling will notably regulate the distance from the checking device to the hull and the orientation of the checking device relative to the hull while the movements of the operating member will allow the tool to be moved over the surface of the hull, thereby simplifying the operator's task.

The tool may comprise a gripper, such as for example a motorized two-jaw clamp, which may act directly on the environment or carry an instrument such as a power drill. The tool may be a passive and non-motorized tool. The robot may comprise no tool but only a clamp, a robotic hand or any other gripper that will be connected to the distal end element either directly (the gripper is then fixed and secured to said element) or via force measurement means such as a load cell or a force measurement member (the gripper is then linked to said element in such a way as to have the same degrees of freedom as said element). The robot may comprise neither tool nor gripper and interact directly with its environment using the distal end element of the robot.

Moreover, the couplings between the operating member and the tool may be implemented using any type of suitable solution, these not being limited to the examples described provided that each movement of the distal end element relative to the proximal end element is:

either coupled passively (for example using cables) or actively (using control means) to a movement of the operating member relative to the distal end element and/or to forces applied to the operating member by the operator, or operated actively (using the control means) or passively (for example using springs or by the robot environment itself such as in the fourth embodiment of the invention) in order to adapt to the environment of the robot.

In that way, use of the robot remains intuitive for the operator.

As has been seen, all the movements of the tool and the operating member can be coupled in a controlled way, which means to say coupled in an active way, using the control means and notably the drive members operated by the controller. As an alternative, just some of the movements of the tool and of the operating member may be coupled in a controlled way. The robot will then for example comprise passive mechanical coupling means chosen so that the movements of the tool are identical to those of the operating member in the other directions, the movements of the tool possibly being amplified in comparison with those of the operating member, or alternatively for example passive mechanical coupling means that automatically operate the movements of the tool in the other directions, such as springs.

It will be further noted that, in the examples illustrated in FIGS. 1 to 17, the movements of the tool are greater in amplitude than those of the operating member but the movements of the tool could also be smaller in amplitude than those of the operating member without departing from the scope of the invention. This could for example be the case with a co-manipulation robot intended for surgery or intended for use in the world of microtechnology or the world of nanotechnology. These movements could even be of similar amplitudes.

Likewise, in the examples illustrated in FIGS. 18 and 19, the forces applied by the tool are greater in amplitude than those applied to the operating member but the forces applied to the tool could also be smaller in amplitude than those exerted on the operating member without departing from the scope of the invention. These forces could even be of similar amplitudes.

The drive members may comprise ironless rotor DC electric motors or brushless motors, conventional DC motors, shape memory alloys, piezoelectric actuators, active polymers, pneumatic or hydraulic actuators. The drive members could even comprise one or more robot brake elements or bodies. These brakes could thus be disk brakes, powder brakes or magnetorheological or electrorheological fluid brakes. The drive members could also comprise hybrid actuators comprising both a motor and a brake or antagonist actuating devices and/or variable stiffness devices of the "series elastic actuator" or "parallel elastic actuator" type. When the drive members comprise reduction gears associated for example with motors, the reduction gears may be of any type and may for example simple gearwheel or epicyclic reduction gears, having one or more stages, reduction gears of the "harmonic drive" (registered trademark) type or ball-screw or capstan cable reduction gears. In place of reversible reduction gears it may be possible to have irreversible reduction gears such as worm and wheel reduction gears.

The displacement measurement means may comprise sensors of any suitable type such as optical encoders, Hall-effect sensors, potentiometers or magneto-optical encoders, it being possible for the sensors to be absolute (multirevolution) or relative. They may even consist of speed or acceleration sensors from which the movements are deduced by single or double integration. The displacement measurement means may be arranged on the drive members or on the various mechanical connections between the elements and/or the bodies of the robot. It may even be possible to have on one or more axes measurement means both on the drive members and on the mechanical connections.

The force measurement means may comprise multiaxis sensors or cells the deformation of the test bodies of which will be measured using strain gages, optical or electromagnetic devices, pressure sensors, either at discrete points or in arrays, monoaxis load cells or torque sensors arranged on the drive members and/or the mechanical connections of the robot or means for measuring the motor currents of the drive members. In the case of the use of motors and/or reduction gears of low efficiency and/or exhibiting significant friction or which are not very reversible, if at all, the measurement means may comprise force sensors the signals of which will be used to compensate for these deficiencies and make the robot reversible.

The passive mechanical coupling means may also comprise for example a mechanism with an offset center of rotation such as, for example and nonlimitingly, a double parallelogram.

The robot may comprise control buttons arranged elsewhere than on the operating member. The control buttons may thus be arranged on the base of the robot, on a separate housing of the secondary or main chain of elements or at any other suitable location. It may also be possible to use any other means of interaction with the robot in addition to or as a substitute for the control buttons, such as, for example and nonlimitingly, a keyboard, a mouse, one or more touch screens or a voice-actuated device. The robot may also be equipped with a device of the "deadman" type.

It is possible for the robot not to comprise an external measurement system or a measurement system other than the one illustrated in FIG. 1 such as, for example: a motion capture system with or without targets such as the ART Track (registered trade name) device, electromagnetic or ultrasound sensors such as Polhemus sensors, laser trackers of the Leica (registered trade name) "Eye Tracker" type, which means to say one based on movements of the eyes of an operator, flight time cameras, depth map cameras, or wide-field-of-view cameras such as the Kinect (registered trade name) systems or the Leap Motion (registered trade name) device. The external measurement system may further comprise a camera operating in any band of the light spectrum, particularly in the domain of visible light or infrared, the images of the system then being processed in order to extract therefrom information regarding the position and orientation of the tool and the state of the robot environment. The external measurement system may further comprise a lighting device associated with the camera to enhance the image contrast. The external measurement system may comprise a plurality of cameras arranged around the robot, in order to have 3D measurement, better resolution or alternatively to avoid blind spots. The external measurement system could further comprise lighting means to illuminate the robot and its environment using a structured light to make measurements easier.

The measurement means could even be associated with a virtual model of the environment and/or of the robot and/or of the operator, which model is used as a support to generate the tool/operating member coupling.

The various kinematic connections have of course been illustrated in simplified form. They could thus be produced using ball bearings, plain bearings, magnetic bearings or any other solution known from the prior art. It might also be advantageous to create fork joint connections, which means to say connections in which force is reacted on each side of the kinematic connection concerned.

Likewise, the various elements and bodies of the robot have been illustrated in simplified form. Thus, these various elements and bodies may be not one piece but made up of several components joined together.

The controller and the control laws implanted therein may differ from what has been described. For example, although the virtual guide is created in a joint space, the virtual guide could be created in a Cartesian space.

The invention claimed is:

1. A co-manipulation robot, comprising:
   a first chain of elements which comprises a proximal end element forming a base of the robot and a distal end element, the various elements being mounted with the ability to move relative to one another so that the distal end element can be moved relative to the proximal end element,
   at least one robot operating member, said member being connected to one of the elements of the first chain of elements, other than the distal end element, and being designed to be able to be moved directly by an operator relative to the proximal end element,
   control means for controlling at least part of the first chain of elements and the operating member,
   the first chain of elements, the operating member and the control means being configured so that at least one movement of the operating member relative to the proximal end element according to at least one degree of freedom of the operating member has, associated with it, a more complex movement of the distal end element relative to the proximal end element according to at least one of the degrees of freedom of the distal end element.

2. The robot as claimed in claim 1, in which the first chain of elements, the operating member and the control means are configured to impose at least one movement of the operating member relative to the proximal end element and/or to impose forces on the operating member.

3. The robot as claimed in claim 1, in which the first chain of elements, the operating member and the control means are configured so that forces applied to the distal end element are coupled to a movement of the operating member relative to the proximal end element and/or to forces applied to the operating member by the operator.

4. The robot as claimed in claim 1, in which the first chain of elements, the operating member and the control means are furthermore configured so that each movement of the distal end element relative to the proximal end element is coupled to a movement of the operating member relative to the proximal end element and/or to forces applied to the operating member by the operator, at least one of the movements of the distal end element relative to the proximal end element being necessarily coupled to a movement of the operating member relative to the proximal end element.

5. The robot as claimed in claim 1, in which the control means comprise drive member arranged on the first chain of elements so that all the relative movements of the various elements of said chain of elements relative to one another are motorized.

6. The robot as claimed in claim 1, in which the control means comprise drive members and in which the robot comprises passive means of mechanical coupling, the drive members and the passive means of mechanical coupling being arranged on the first chain of elements so that some of the relative movements between the various elements of said chain of elements are motorized and the others are operated passively.

7. The robot as claimed in claim 1, further comprising a second chain of elements which comprises at least one first body connected to one of the elements of the first chain of elements, the operating member then being connected to said element via the second chain of elements.

8. The robot as claimed in claim 7, in which the control means comprise drive members arranged on the second chain of elements so that all the relative movements of the various bodies of said second chain of elements relative to one another and between the first body and the element of the first chain of elements to which the first body is connected are motorized.

9. The robot as claimed in claim 1, further comprising a tool and/or a gripper connected to the distal end element so as to have the same degrees of freedom as said distal end element.

10. The robot as claimed in claim 1, configured so that the number of degrees of freedom of the operating member relative to the proximal end element is strictly less than the number of degrees of freedom of the distal end element relative to the proximal end element.

11. The robot as claimed in claim 1, in which at least the first chain of elements and the operating member are configured so that the movements of the operating member relative to the proximal end element are identical to the movements of the distal end element relative to the proximal end element in certain directions, said movements not being controlled by the control means.

12. The robot as claimed in claim 1, in which the control means are configured so as to control at least one of the movements of the distal end element relative to the proximal end element as a function of forces applied to the operating member by the operator.

13. The robot as claimed in claim 1, in which the control means comprise load-measuring mean measuring the forces exerted on the distal end element, a tool or a gripper.

14. The robot as claimed in claim 13, in which the measuring means comprise a multiaxis load cell.

15. The robot as claimed in claim 1, in which the control means comprise load measuring means for measuring the forces exerted on the operating member by the operator.

16. The robot as claimed in claim 1, in which the control means comprise a controller that makes it possible to program couplings between the control member and the distal end element, the robot comprising activating means for activating at least one of the couplings implemented in the controller.

17. The robot as claimed in claim 16, in which the activating means comprise at least one control button arranged on the operating member.

18. The robot as claimed in claim 1, in which the control means comprise a controller making it possible to program couplings between the operating member and the distal end element, the controller comprising a force augmentation corrector that makes it possible to amplify, at the distal end, at a tool, or at a gripper, forces applied by the operator to the operating member, and to do so for at least certain degrees of freedom of the distal end, of the tool or of the gripper.

19. The robot as claimed in claim 1, in which the control means comprise a controller making it possible to program couplings between the operating member and the distal end element, the controller comprising a virtual mechanism that makes it possible to guide the movements of the operating member at least according to certain degrees of freedom of the operating member.

20. The robot as claimed in claim 1, in which the control means comprise an external measurement system.

21. The robot as claimed in claim 1, in which the operating member is directly connected to one of the elements of the first chain of elements so as to be secured to said element.

22. The robot as claimed in claim 1, in which the operating member is connected to one of the elements of the first chain of elements via load measuring means so that the operating member has only the same degrees of freedom as said element.

* * * * *